US00RE40336E

(19) United States
(12) Reissued Patent
Fernandez Muñoz et al.

(10) Patent Number: US RE40,336 E
(45) Date of Reissued Patent: May 27, 2008

(54) COUPLING FOR THE TEETH OF EXCAVATORS AND THE LIKE

(75) Inventors: Roberto Fernandez Muñoz, El Masnou (ES); Francisco Perez Soria, Premia de Mar (ES); Lorenzo Navarro Romero, Mataro (ES); Jose Antonio Laforet Alvarez, Vilassar de Dalt (ES)

(73) Assignee: Metalogenia Patentes, S.L., Barcelona (ES)

(21) Appl. No.: 10/388,549

(22) Filed: Mar. 17, 2003

Related U.S. Patent Documents

Reissue of:
(64) Patent No.: 6,321,471
Issued: Nov. 27, 2001
Appl. No.: 09/747,328
Filed: Jan. 3, 2001

U.S. Applications:
(63) Continuation of application No. PCT/ES99/00206, filed on Jul. 1, 1999.

(30) Foreign Application Priority Data

Jul. 3, 1998 (ES) ..... 9801404

(51) Int. Cl.
*E02F 9/28* (2006.01)

(52) U.S. Cl. ..... 37/456
(58) Field of Classification Search ..... 37/455, 37/452, 453, 456, 450, 451, 446
See application file for complete search history.

(56) References Cited

U.S. PATENT DOCUMENTS

| | | | |
|---|---|---|---|
| 247,148 | A | 9/1881 | Anderson |
| 1,775,984 | A | 9/1930 | Younie |
| 2,050,014 | A | 8/1936 | Morrison |
| 2,435,846 | A | 2/1948 | Robertson |
| 2,483,032 | A | 9/1949 | Baer |
| 2,921,391 | A | 1/1960 | Opsahl |
| 3,117,386 | A | 1/1964 | Ferwerda |
| 3,496,658 | A | 2/1970 | Eyolfson |
| 3,520,224 | A | 7/1970 | Hensley et al. |
| 3,574,962 | A | 4/1971 | Smith |
| 3,839,805 | A | 10/1974 | Stepe |
| 3,919,792 | A | 11/1975 | Hahn et al. |
| 4,182,058 | A | 1/1980 | Poncin |
| 4,192,089 | A | 3/1980 | Schwappach |
| 4,404,760 | A | 9/1983 | Hahn et al. |
| 4,414,764 | A | 11/1983 | Johansson et al. |
| 4,625,439 | A | 12/1986 | Johansson et al. |
| 4,727,663 | A | 3/1988 | Hahn |
| 4,799,823 | A | 1/1989 | Williams |
| 4,811,505 | A | 3/1989 | Emrich |
| 4,965,945 | A | 10/1990 | Emrich |
| 5,068,986 | A | 12/1991 | Jones |
| 5,088,214 | A | 2/1992 | Jones |

(Continued)

FOREIGN PATENT DOCUMENTS

| | | |
|---|---|---|
| EP | 1 096 073 A1 | 2/2001 |
| ES | 0419646 A | 3/1976 |
| ES | 2077412 T | 11/1995 |
| ES | 2146174 A | 7/2000 |
| GB | 1272955 | 5/1972 |
| WO | WO 92/19822 A1 | 12/1992 |
| WO | WO 00/01897 A1 | 1/2000 |

*Primary Examiner*—Christopher J. Novosad
(74) *Attorney, Agent, or Firm*—Sughrue Mion, PLLC

(57) ABSTRACT

A device for coupling a tooth and tooth-carrier. The device including three successive areas from the median portion of a coupling part to its free end. A first area comprises stepped straight guides that open on lateral outer surfaces of the coupling part. Following the first area is a second guiding area comprising revolution surfaces, opposed to one another. A third, terminal area is shaped as a prismatic rod having its axis coinciding with that of the coupling part.

47 Claims, 20 Drawing Sheets

U.S. PATENT DOCUMENTS

| | | | |
|---|---|---|---|
| 5,325,615 | A | 7/1994 | Hutchins et al. |
| 5,386,653 | A | 2/1995 | Cornelius |
| 5,423,138 | A | 6/1995 | Livesay et al. |
| 5,456,029 | A | 10/1995 | Cornelius |
| 5,469,648 | A | 11/1995 | Jones et al. |
| 5,502,905 | A | 4/1996 | Cornelius et al. |
| 5,561,925 | A | 10/1996 | Livesay |
| 5,617,655 | A | 4/1997 | Launder et al. |
| 5,653,048 | A | 8/1997 | Jones et al. |
| 5,765,301 | A | 6/1998 | Clendenning |
| 5,778,570 | A | 7/1998 | Eichelberger |
| 5,802,752 | A | 9/1998 | Quarfordt |
| 5,918,391 | A | 7/1999 | Vinas Peya |
| 5,987,787 | A | 11/1999 | Mack |
| 6,030,143 | A | 2/2000 | Kreitzberg |
| 6,047,487 | A | 4/2000 | Clendenning |
| 6,240,663 | B1 | 6/2001 | Robinson |
| 6,321,471 | B2 | 11/2001 | Fernandez Munoz et al. |
| 6,477,796 | B1 | 11/2002 | Cornelius |
| 2001/0001352 | A1 | 5/2001 | Fernandez Munoz et al. |

COUPLING FOR THE TEETH OF EXCAVATORS AND THE LIKE

Matter enclosed in heavy brackets [ ] appears in the original patent but forms no part of this reissue specification; matter printed in italics indicates the additions made by reissue.

This [application] *is a Reissue of U.S. Pat. No. 6,321,471, issued on Nov. 21, 2001, from U.S. patent application Ser. No. 09/747,328, filed Jan. 3, 2001, which* is a continuation of *Application Serial No.* PCT/ES99/00206, filed Jul. 1, 1999.

The present invention is intended to disclose a device for coupling excavator teeth of the type used on excavating machines and the like, that is to say, machines intended to remove masses of earth and stones in public and civil engineering works.

For the removal of masses of earth and stones in civil engineering works of all types, excavating machines of different types are traditionally used which comprise buckets equipped with working edges which are those intended to engage in the mass of earth and stones for their removal. For this reason, there are problems of accelerated wear of the cutting edge, which has to be provided with very hard, detachable members having a high mechanical strength which are the so-called "teeth". The said teeth are produced from materials having a high degree of hardness and mechanical strength, in order to obtain a more extended working life, and need to be exchanged easily, since their purpose is precisely that of bearing the wear of the working area, so that it is essential for their exchange to be easy and rapid.

The teeth or excavators and the like have to fulfill a series of conditions which in some cases are contradictory and which represent on the one hand reduced manufacturing costs given the type of application for which they are to be used and the frequency of their renewal, and on the other hand high strength and the most extended life possible.

The harmonization of this combination of characteristics is not easy in devices for coupling excavator teeth since, firstly, owing to the fact that they need to be low-cost mass-produced articles, it is not possible to have recourse to mechanization of the parts in order to obtain more or less narrow tolerances in their dimensions, so that it is necessary to carry out their manufacture on the basis of economical production methods for obtaining solid parts, such as casting and forging. However, the use of cast or forged parts represents an important limitation in the dimensional tolerances which can be obtained on the excavator teeth, resulting in limitations to good coupling between the tooth and the so-called tooth-carrier, which is the element for connection with the active edge of the bucket of the excavator. A result of the said unsatisfactory coupling is the occurrence of different operational problems due to incorrect fitting of the tooth in the tooth-carrier, which manifests itself in high local contact pressures with the consequent wear and increase in the coupling play between the tooth and the tooth-carrier, which in turn accelerates the problems of wear and leads to a reduction in the useful life of the coupling.

For the technical reasons mentioned above, one of the permanent problems in the manufacture of teeth for excavators lies in obtaining designs which make it possible to achieve improvements in the coupling of the tooth to the tooth-carrier without this meaning an excessive increase in the difficulties of manufacture and therefore in the cost of said parts. For this reason, numerous systems for coupling the tooth to the tooth-carrier have been disclosed, all of which claim to introduce improvements in the design of the parts and therefore in the coupling of the latter.

U.S. Pat. No. 4,404,760 discloses a coupling with an adapter and a point element in which the adapter has a recess with ears and a nose portion which develop from a conical form to a free rectangular end.

The present invention has ears, which have a support function as they are capable of absorbing efforts transmitting the same from the end of the point to the adapter.

The coupling of the present invention is precisely the result of the work carried out by the inventors in order to obtain a more balanced solution to the technical problems which arise on the teeth of the excavators. The result of the investigations and work performed by the inventors is that of obtaining a device for coupling excavator teeth which combines in a satisfactory manner the characteristics of mechanical robustness necessary in the part with significant ease of manufacture and with an extended life of the coupling.

According to the present invention, the satisfactory results thereof are obtained by means of a specific combination of elements for guiding and coupling the teeth in the tooth-carrier, which combination consists in: coupling by interposing special projections of the teeth which are equipped with a double, stepped internal guide, with complementary recesses of the toothcarrier, mutual coupling in areas of revolution symmetrical to the coupling, and finally male/female coupling in a terminal prismatic area. The combination of these three types of principal coupling is obtained by producing a first area of coupling between tooth and tooth-carrier which comprises seatings which open on the edge of the tooth-carrier and which have internally a double straight guide which assumes the form of a profile which has in cross-section a double straight stepped region and which extends through the sides of the tooth-carrier parallel to the axis of the part. The tooth has projecting areas complementary to the said parts having a double stepped guide structure, so that, after their introduction, the aforesaid projecting areas are properly engaged in the double guide recesses, providing multiple areas of coupling between the tooth and the tooth-carrier in a transverse arrangement at 90° which provide a very effective coupling with many areas of contact between the two parts. The immediate area of coupling between tooth and tooth-carrier has symmetrical revolution surfaces opposed to one another, assuming the form of areas of cylindrical or frustoconical surfaces, arranged on the start of the tooth coupling rod intended to coincide in the complementary opening of the tooth-carrier and, preferably, in an arrangement such that one of the revolution surfaces is arranged on the upper portion of the part and the other, symmetrically opposed to the first, is arranged on the lower portion of the part. The third area of coupling between tooth and tooth-carrier, combined with those described above, constitutes a terminal journal of the coupling projection of the tooth, which assumes a prismatic structure with the edges rounded and the axis of which coincides with the axis of the part. The tooth has a coupling opening the structure of which is complementary to that of the tooth-carrier, there being obtained by means of the combination of the three separate areas of coupling which have been mentioned a very effective coupling between the tooth and the tooth-carrier which, without altering the favourable characteristics of manufacture by means of casting or forging, permits effective guiding of both parts with respect to each other, with the result that the areas of contact between tooth and tooth-carrier are significantly increased, which leads to less individual wear and therefore a more extended life of the coupling.

These improvements likewise provide for the arrangement of the seating of the bolt or cotter pin in the body or portion of the tooth-carrier which is not covered by the tooth, making it possible to increase the strength of the tooth-carrier, which in turn makes it possible to reduce the said tooth-carrier internally, reducing the weight of the assembly. The upper and lower ends of the seating for the retaining pin or bolt will optionally be closed by means of covers intended to preserve the seating of the cotter pin as far as possible, facilitating its subsequent disassembly at the right moment. The retaining bolt or pin will have a structure consisting of a base body carrying a centering extension which is joined to the base body by vulcanization. In order to permit the inspection of the correctly introduced state of the cotter pin and likewise certain manipulations which may be necessary for extraction, the tooth will have in one of its lateral fitting lugs an opening which coincides with the position of the bolt.

The constitution of the assembly of tooth and tooth-carrier may be symmetrical or symmetrical with respect to the male and female lateral guides.

For greater understanding there are appended, by way of explanatory but non-limiting example, explanatory drawings of a preferred embodiment of the present invention.

Figure 21:
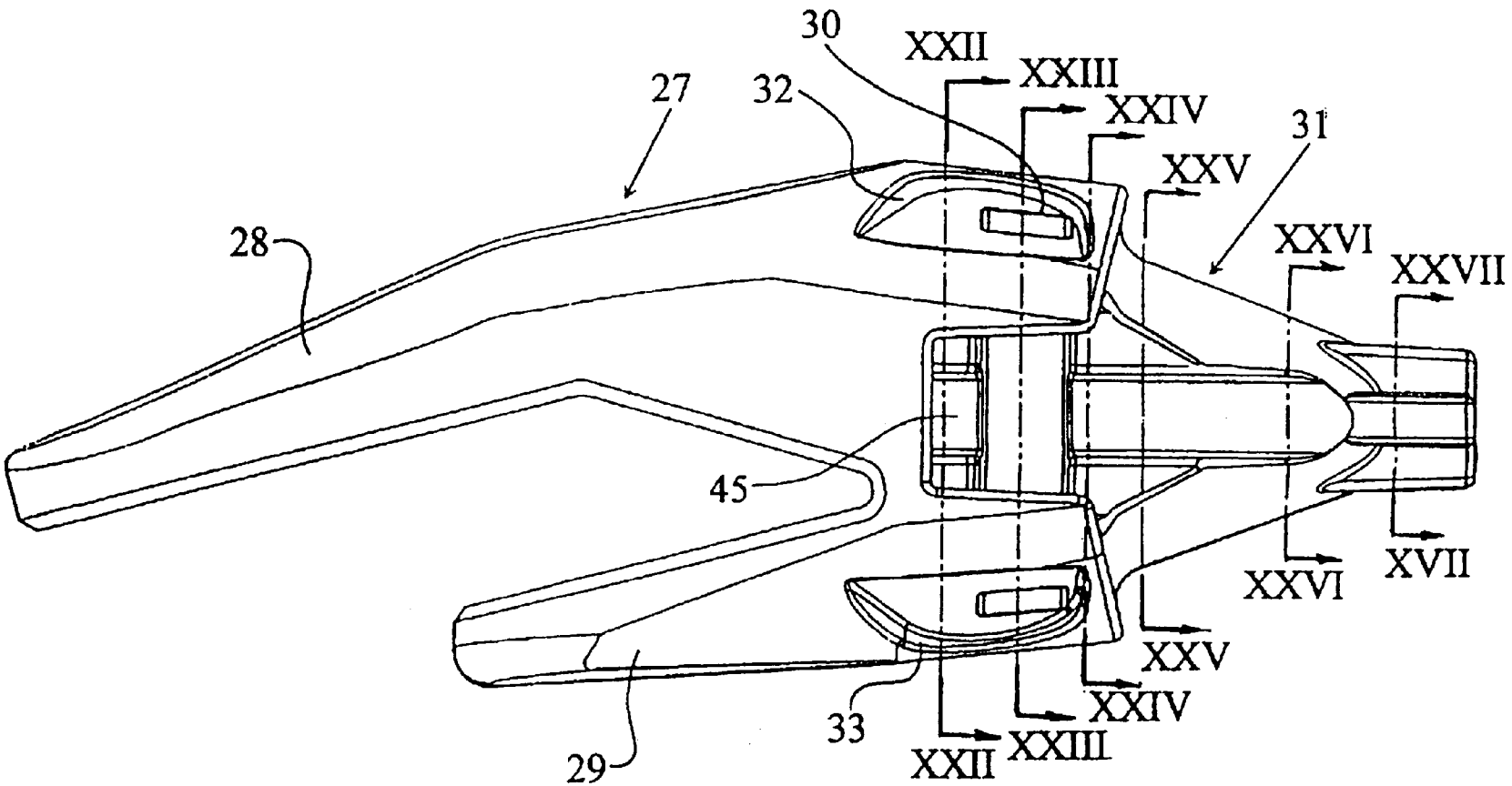
FIG. 21 shows a side view in elevation of a variant of the tooth-carrier illustrated In FIG. 1 and following figures.
Figure 22:
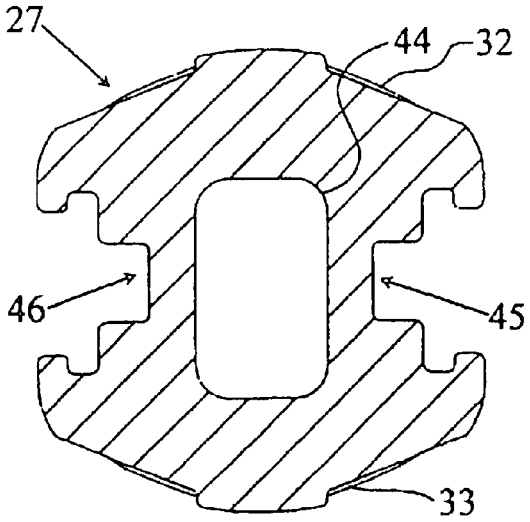
FIGS. 22 to 27 are sections through the section planes indicated in FIG. 21.
Figure 28:
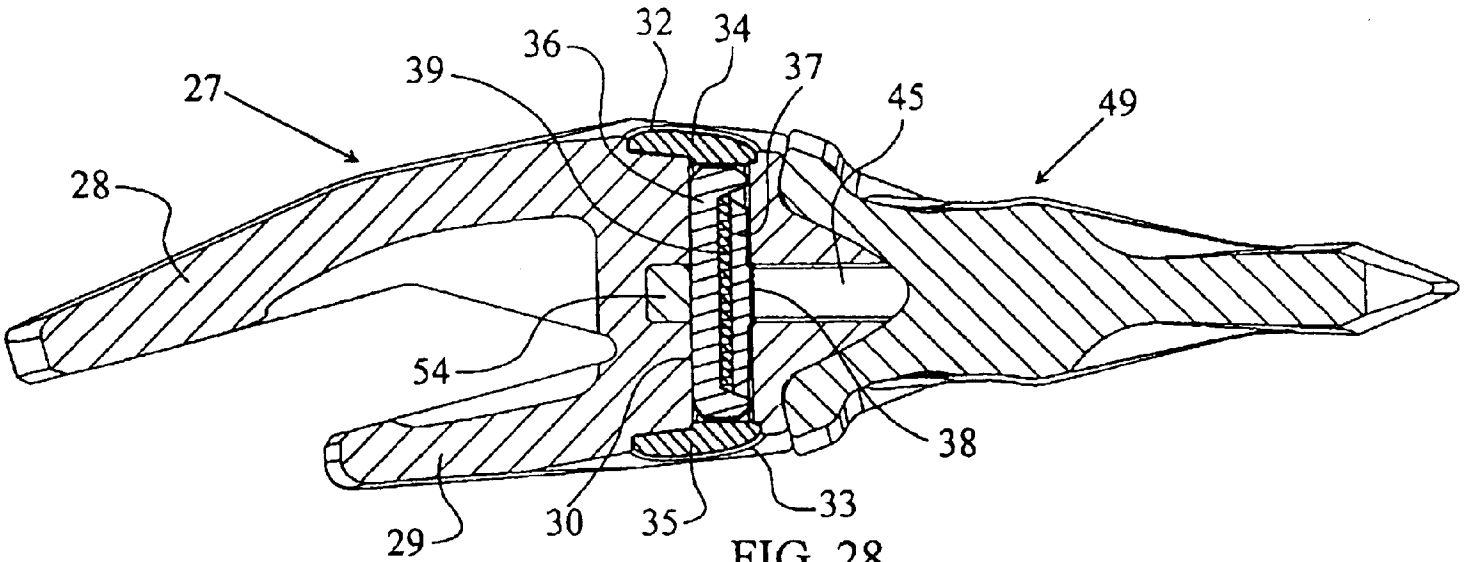
Figure 29:
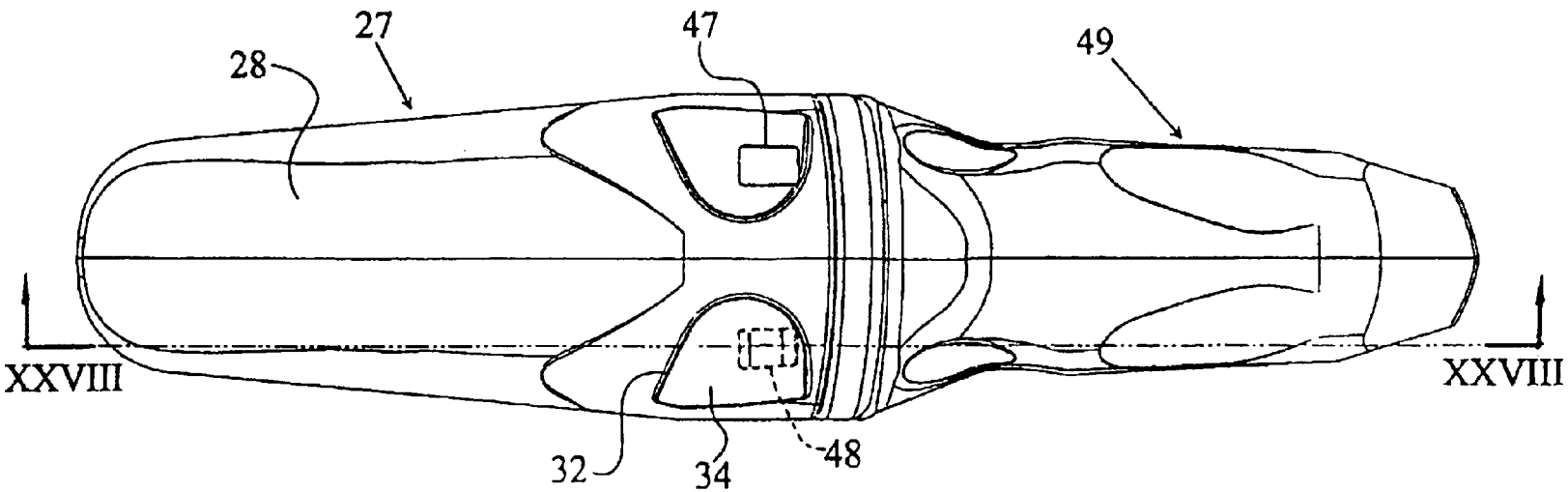

FIGS. 28 and 29 respectively show a longitudinal section through the assembly of tooth-carrier and tooth according to the variant in FIG. 21.

Figure 30:
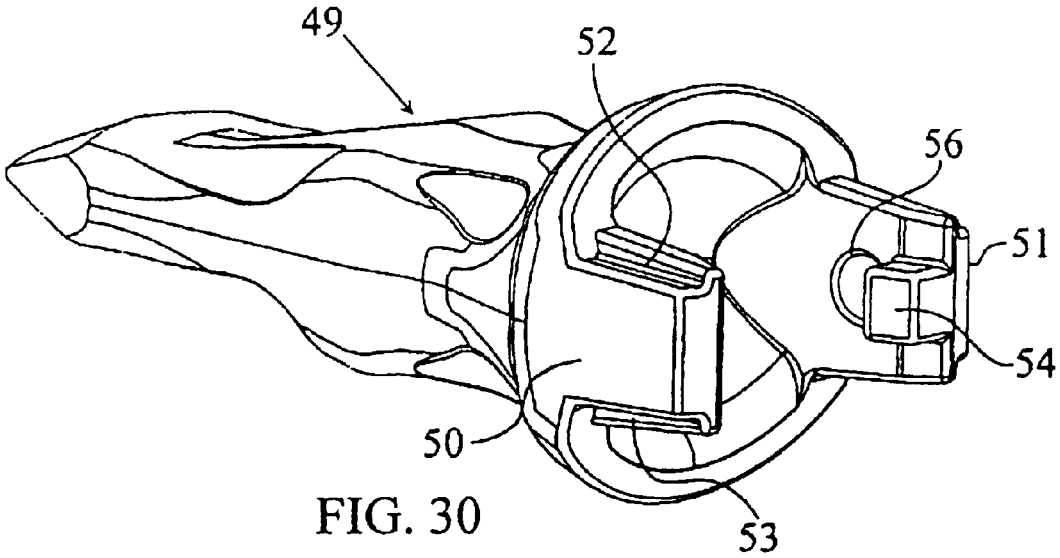
Figure 31:
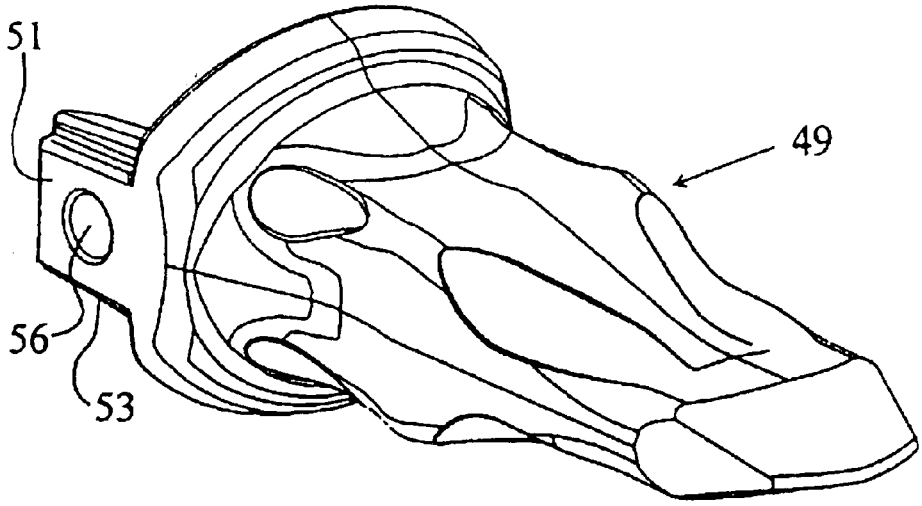

FIGS. 30 and 31 are respective views in rear and front perspective of the tooth according to the present improvements.

Figure 32:
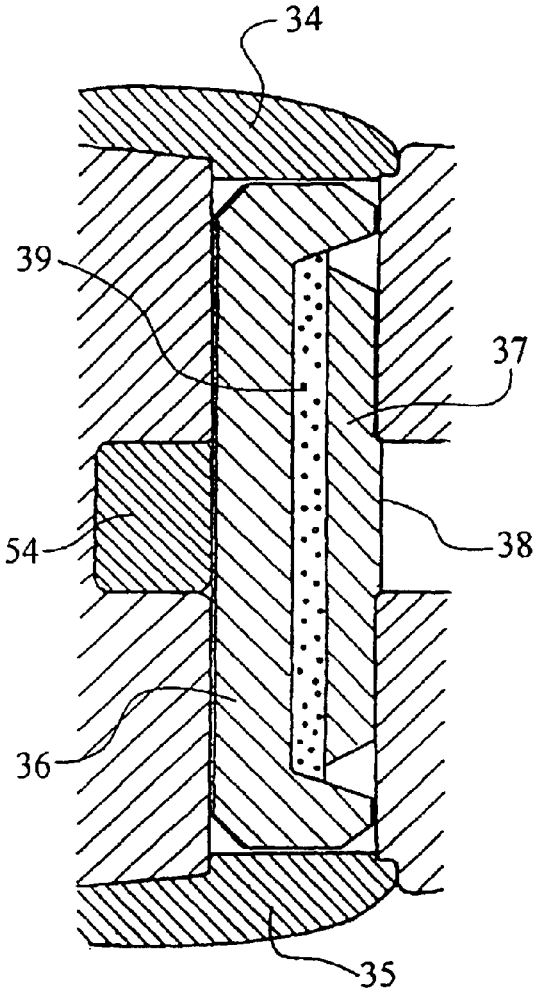
Figure 33:
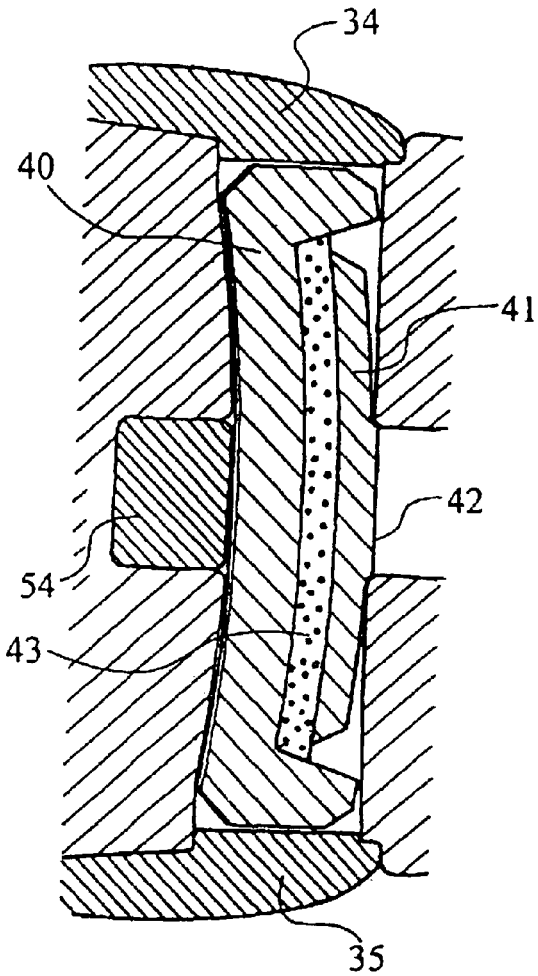

FIGS. 32 and 33 show respective sections through bolts for retaining the tooth, according to the present improvements.

Figure 34:
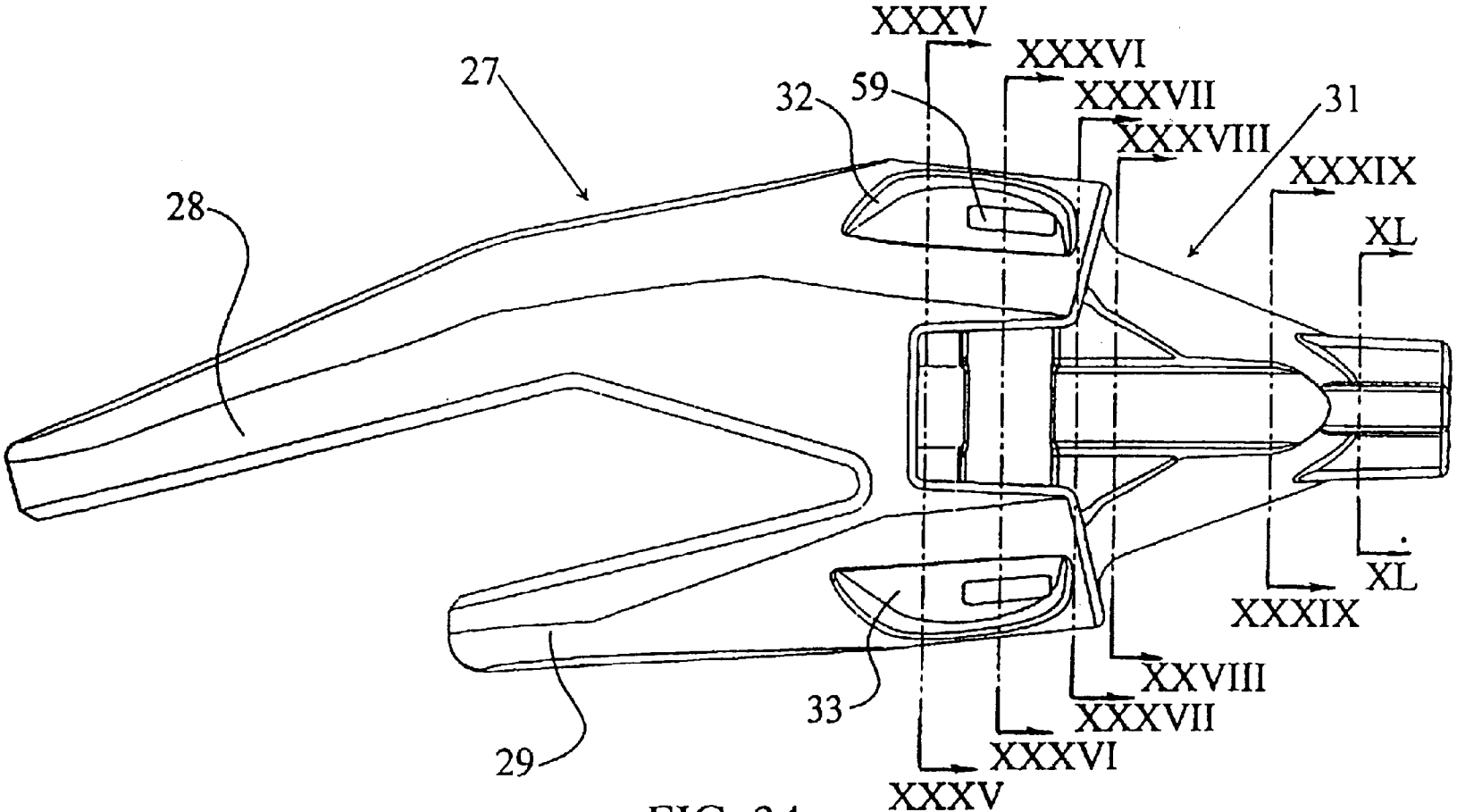

FIG. 34 shows a view in side elevation of an alternative version of that shown in FIG. 21, with asymmetric arrangement of the lateral guides.

FIGS. 35 to 40 are sections through the section planes indicated in FIG. 34.

Figure 41:
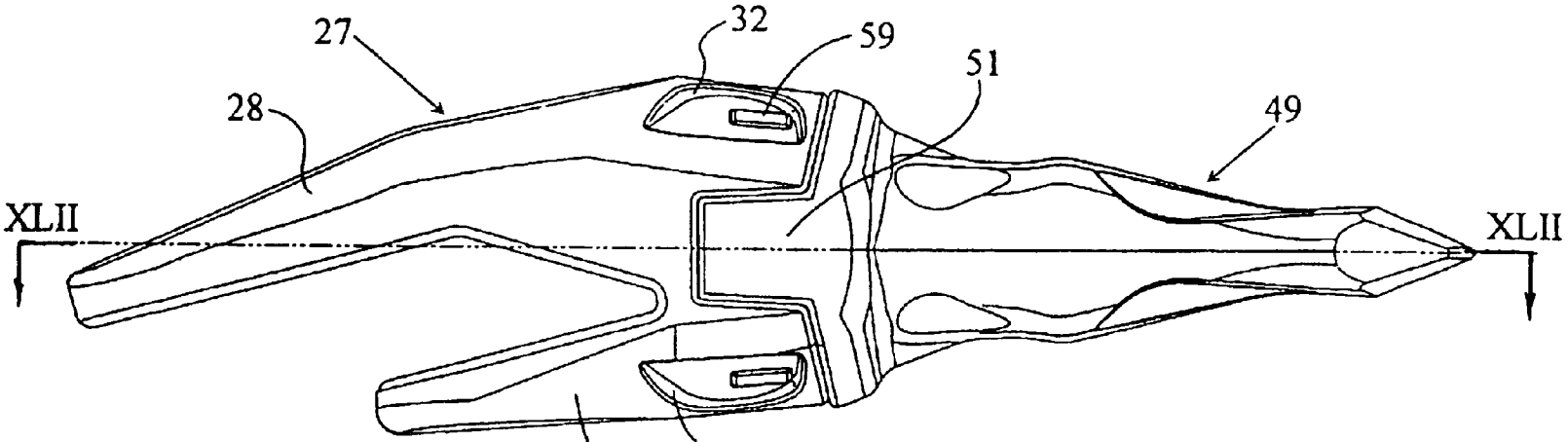

FIG. 41 is a perspective view of the assembly formed by the tooth-carrier and tooth according to the variant in FIG. 34.

Figure 42:
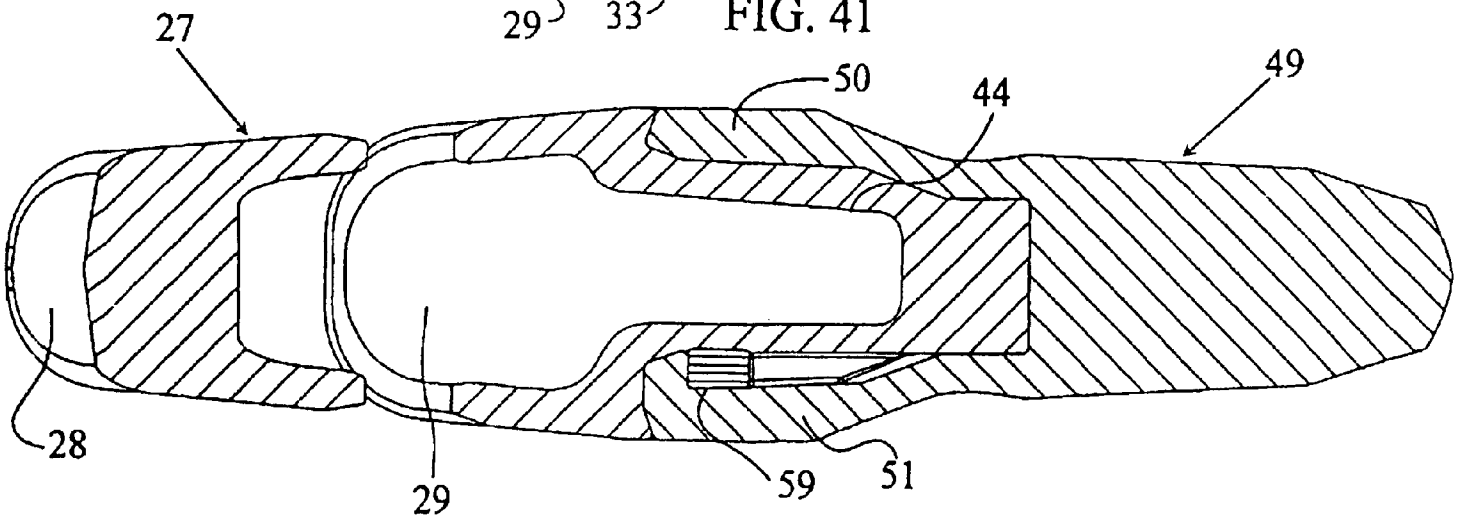

FIG. 42 shows a longitudinal section according to the section plane indicated in FIG. 41.

Figure 43:
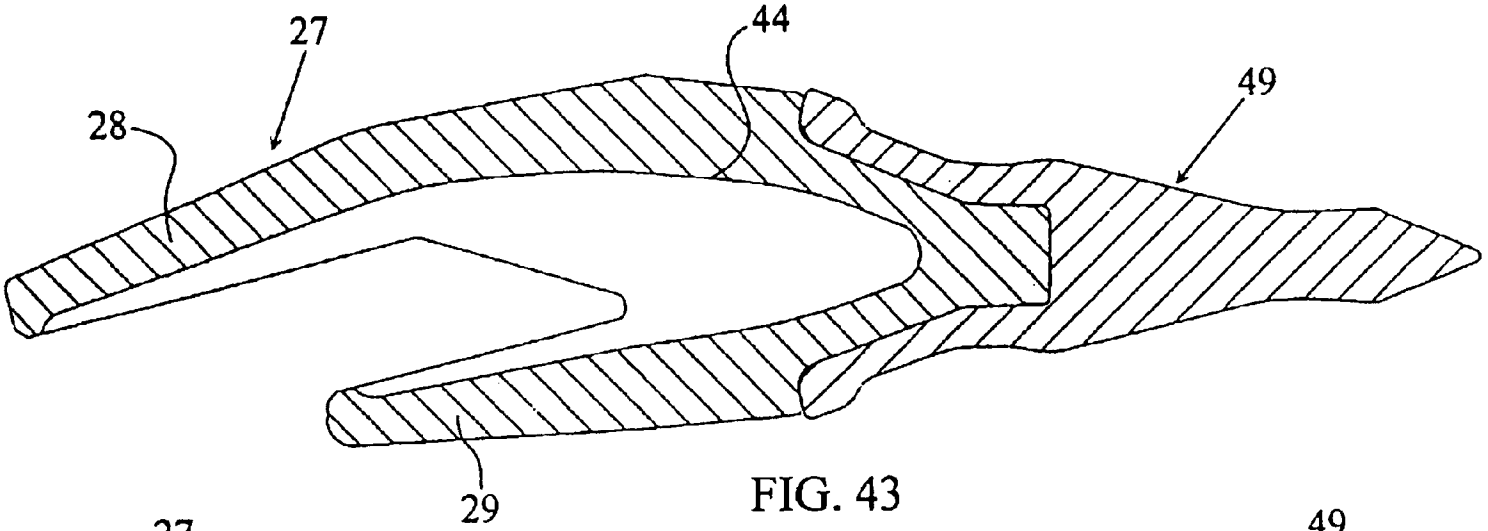
Figure 44:
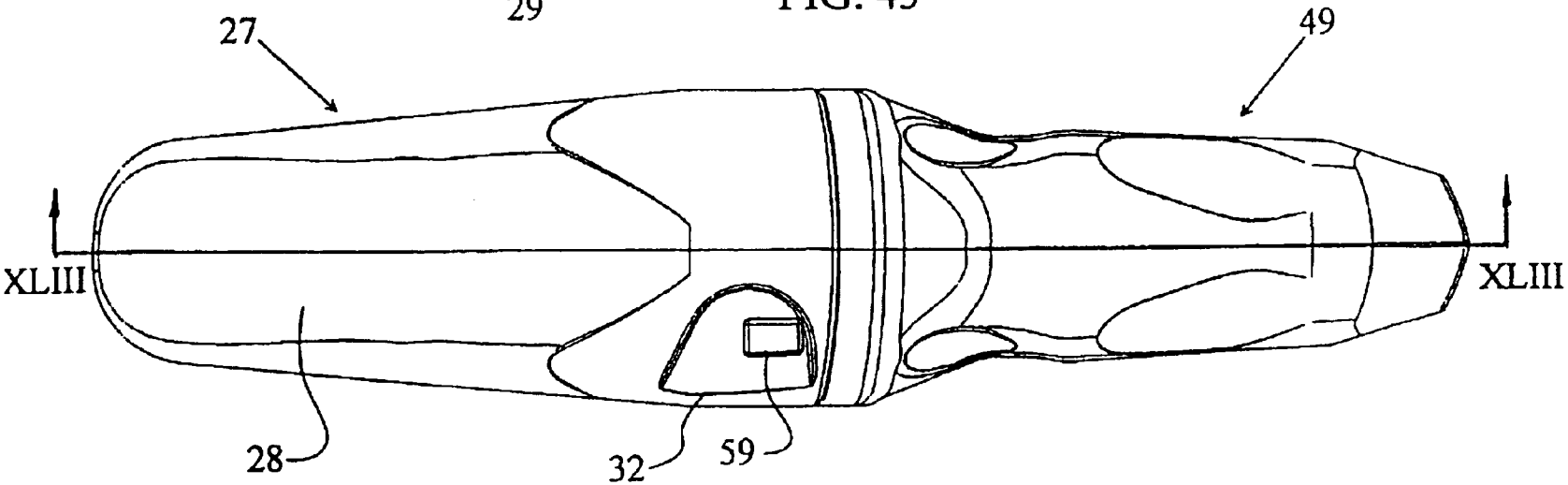

FIG. 43 shows a second longitudinal section through the section plane indicated in FIG. 44, perpendicular to the section indicated in FIG. 42.

FIG. 44 shows a plan view of the assembly of tooth-carrier and tooth according to the present improvements.

Figure 45:
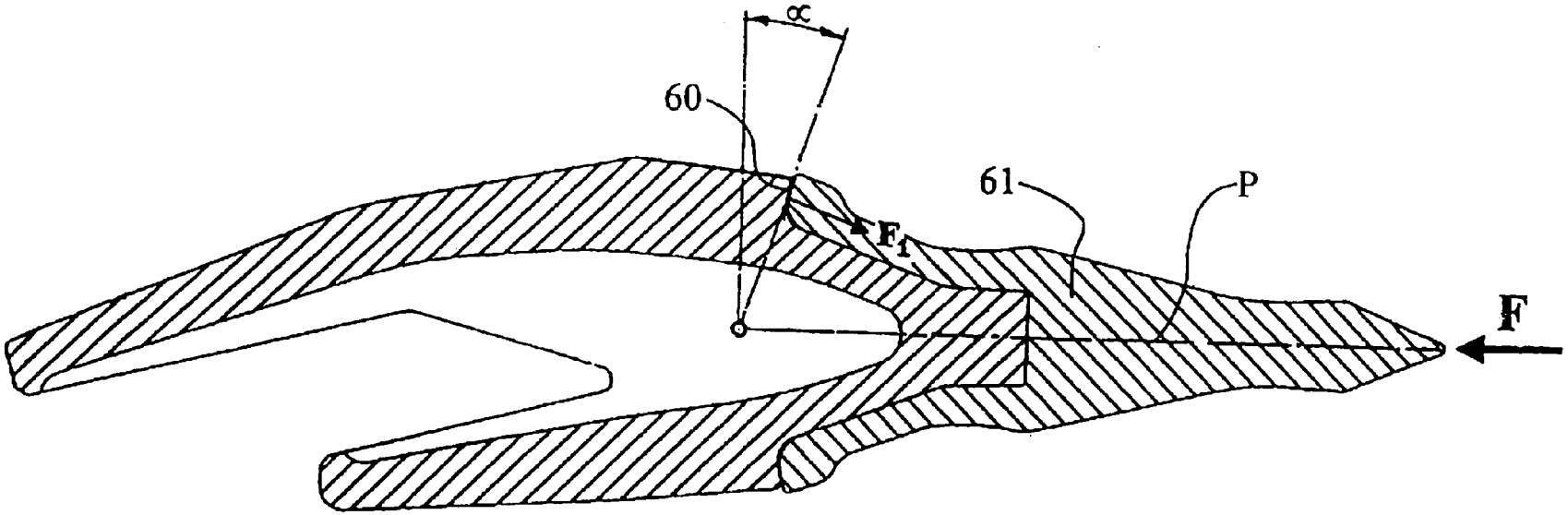

FIG. 45 shows a detail in section of the assembly of tooth and tooth-carrier according to the present invention, showing a variant of the edge where the tooth and tooth-carrier coincide.

Figure 46:
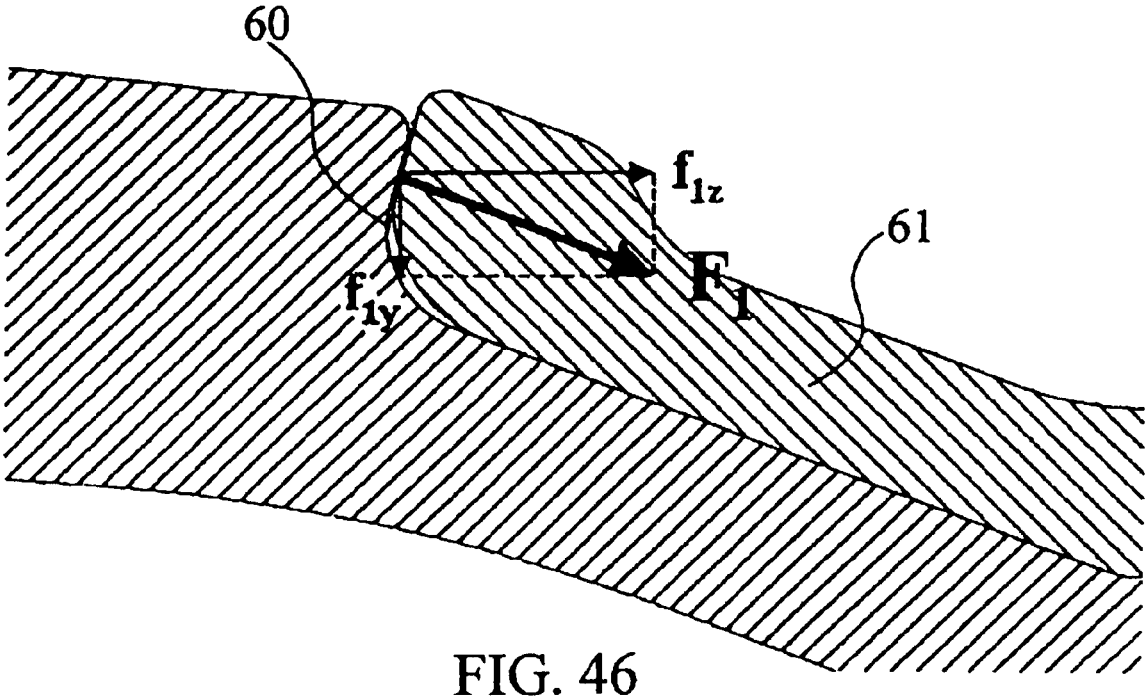

FIG. 46 shows a detail in section illustrating the stresses generated in the coupling in FIG. 45.

According to the figures, the coupling device comprises firstly the tooth-carrying element designated generally by 1, carrying the male coupling which consists of an area 2 for coupling with the tooth and an area 3 for coupling with the active edge of the bucket of the excavator. The area 3 has a basically fork-shaped structure heaving arms 4 and 5 with a straightedged indentation 6 for coupling it to the active edge of the bucket by welding or other means. The projecting portion 3 has, as is customary in these coupling devices, a structure of decreasing section from the starting face 7 of the projection 2 to the terminal straight end 8. According to the present invention, the coupling 1 has on each of its sides respective openings 9 and 10 which start on the face 7 and which extend to the end 3 for coupling with the edge of the bucket, it being characteristic of the said openings that both have a structure based on a double internal guide by means of transverse straight steps, as will be seen in FIGS. 3 to 6, in which it will be observed that the openings 9 and 10 have rectilinear generatrices parallel to the axis of the part, assuming a form in cross-section in which there is constituted a double straight guide with intermediate step, having, for example, for the guide opening 9 the straight, parallel walls 11 and 12 of the first straight guide and the walls of the straight guide of the bottom of the indentation 9 which are indicated by 13 and 14. The straight guides of each side, for example 12 and 13, and also 11 and 14, are separated by respective straight steps 15 and 16. The structure of the indentation 10 is identical to that explained for the indentation 9, so that it will not be explained in greater detail. The provision of the double stepped guide improves the coupling between tooth and tooth-carrier by increasing the effective areas of contact between the two parts in the initial assembly. The tooth 17, FIGS. 15 and 16, has projecting lateral wings 18 and 19 of a shape complementary to that of the openings with double stepped guide 9 and 10, as can be seen in FIGS. 15 and 16, 19 and 20.

Figure 11:
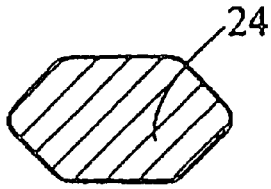
FIG. 11 is a cross-section through the prismatic end journal of the coupling.
Figure 12:
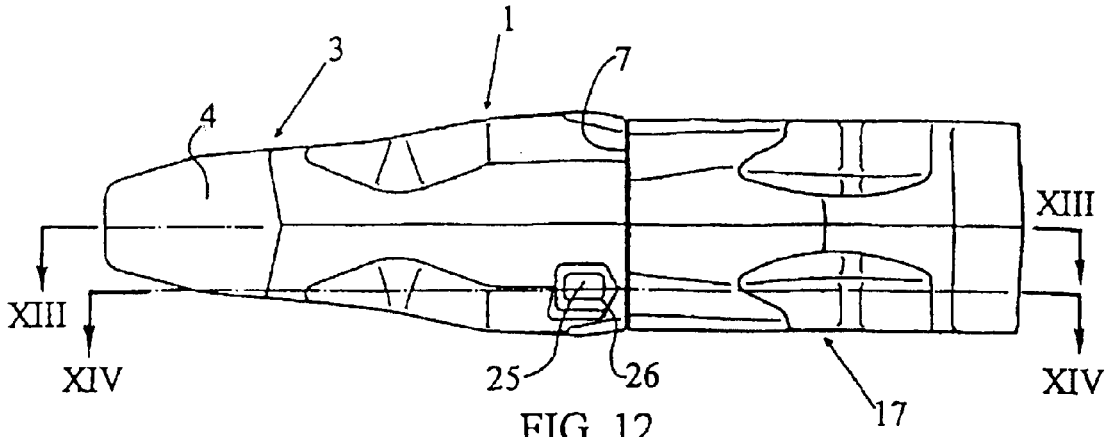
FIG. 12 shows a plan view of the assembly of tooth and tooth-carrier according to the present invention.
Figure 13:
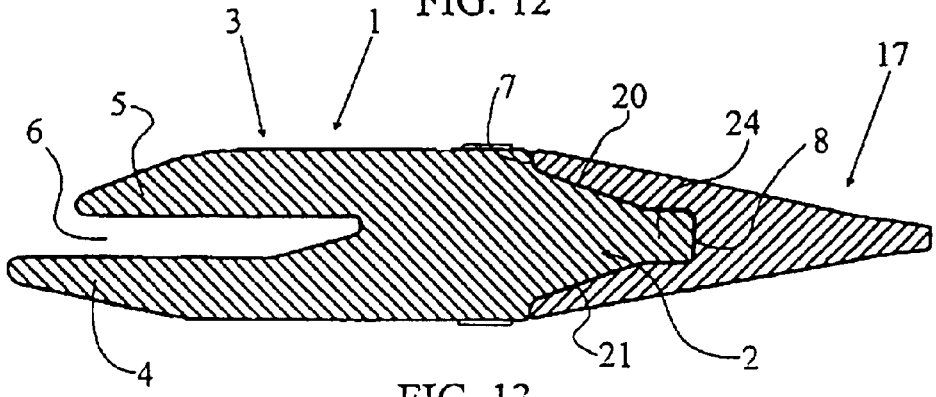
FIGS. 13 and 14 show longitudinal sections according to the section planes indicated.
Figure 14:
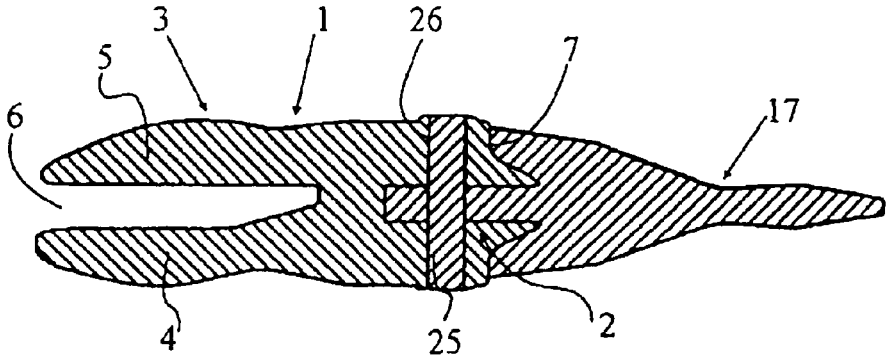
Figure 15:
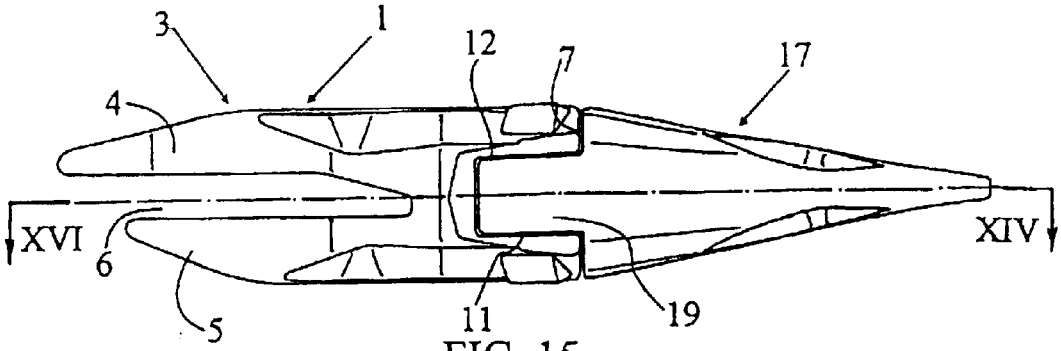
FIG. 15 shows a view in side elevation of the assembly of tooth and tooth-carrier.
Figure 16:
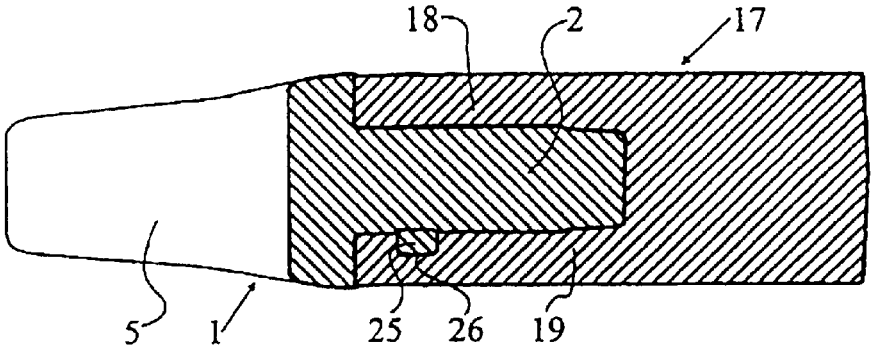
FIG. 16 shows a section according to the section plane indicated in FIG. 15.
Figure 17:
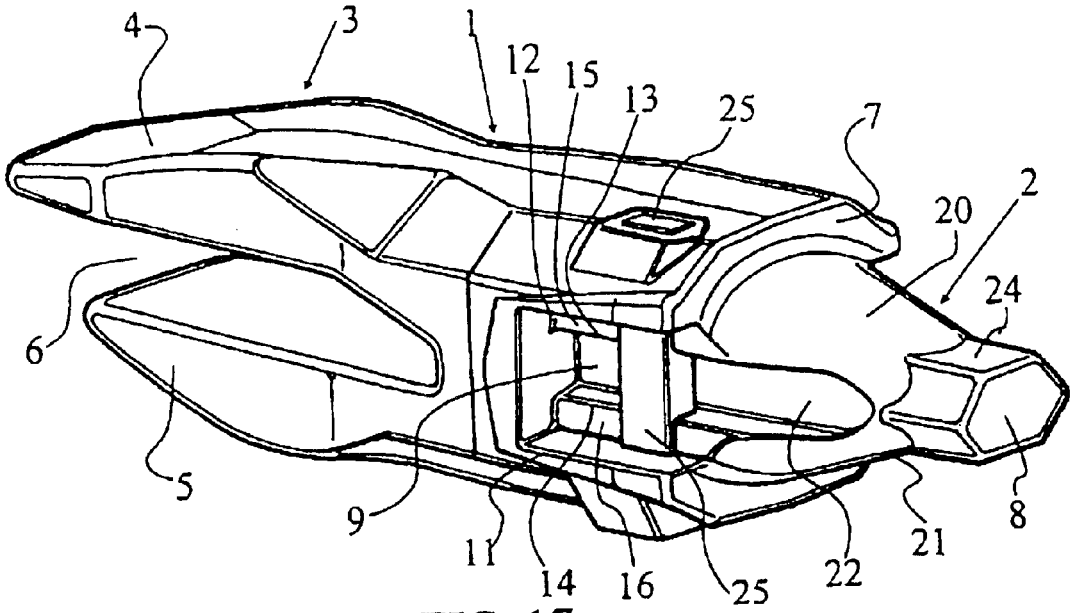
FIG. 17 shows a perspective view of the coupling device from the right-hand side corresponding to the cotter pin.
Figure 18:
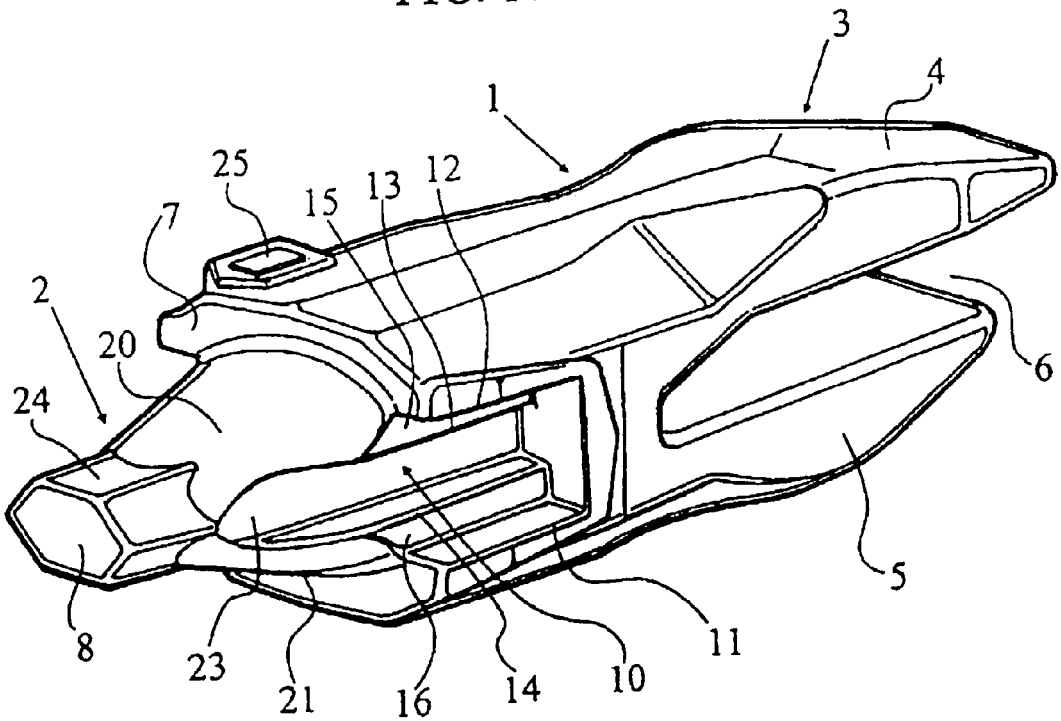
FIG. 18 shows a perspective view similar to FIG. 17 from the opposite side from the cotter pin.
Figure 19:
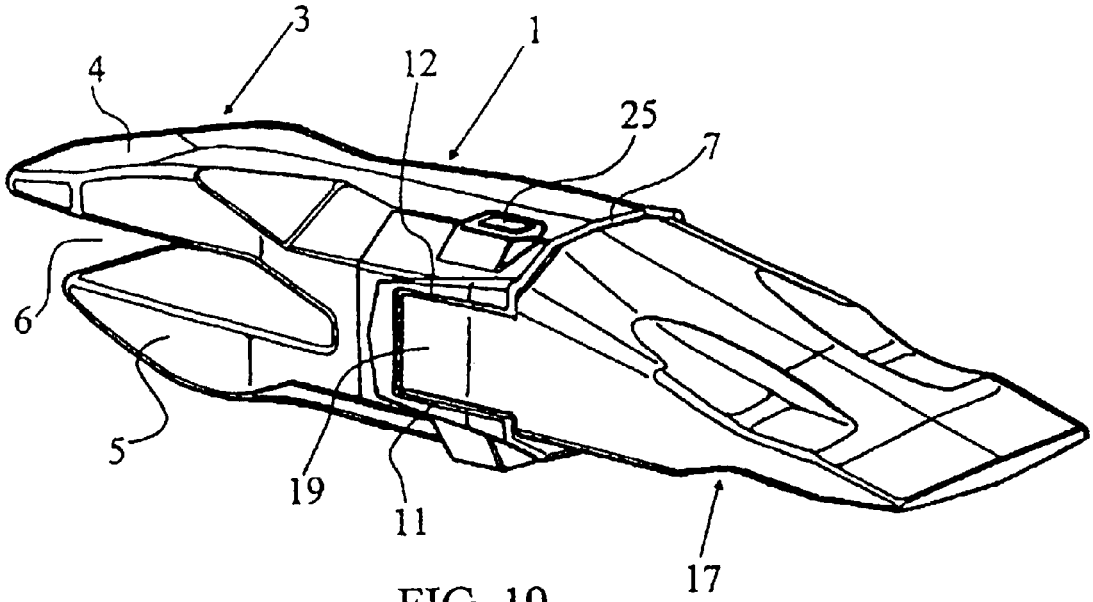
FIG. 19 shows a perspective view of an assembly of tooth and tooth-carrier according to the present invention.
Figure 20:
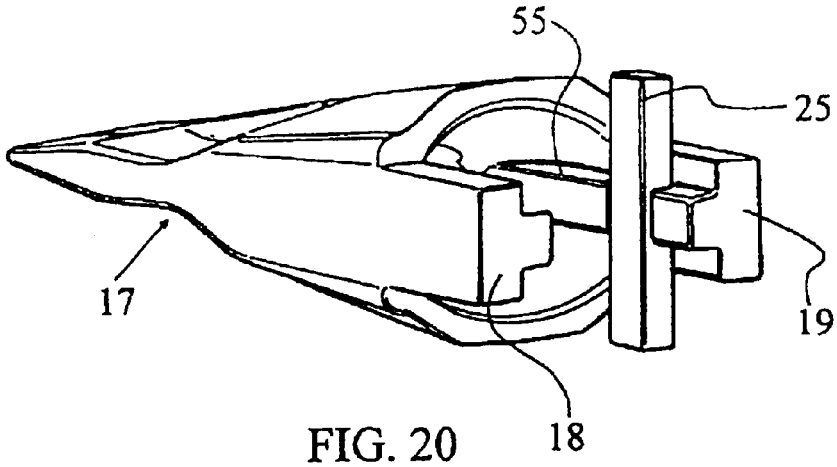
FIG. 20 shows a perspective view of the tooth which incorporates the coupling device of the present invention.

The coupling projection 2 has, after its start from the face 7 of the part 1, an area of coupling by means of revolution surfaces, which are formed by two surfaces 20 and 21, FIGS. 7 to 10, which may be constituted by frustoconical or cylindrical surfaces arranged in opposition to one another and symmetrical with respect to tile axis of the part, which coincides with the axis of symmetry of the sections illustrated. The lateral grooves 22 and 23 extend along the said coupling area, ending in the most remote section illustrated in FIG. 10, in which the two revolution surfaces opposed to each other, indicated in this case by 20' and 21', are practically joined by their ends. The third principal guiding area is formed by the rod 24 at the free end of the coupling area 2, which assumes a straight prismatic structure with rounded edges, as will be seen in FIG. 11.

The coupling is completed by means of a transverse cotter pin 25 which is intended to retain the tooth 17 and which is housed in a transverse opening 26 which opens in the part 1 in the immediate vicinity of the face 7.

Figure 1:
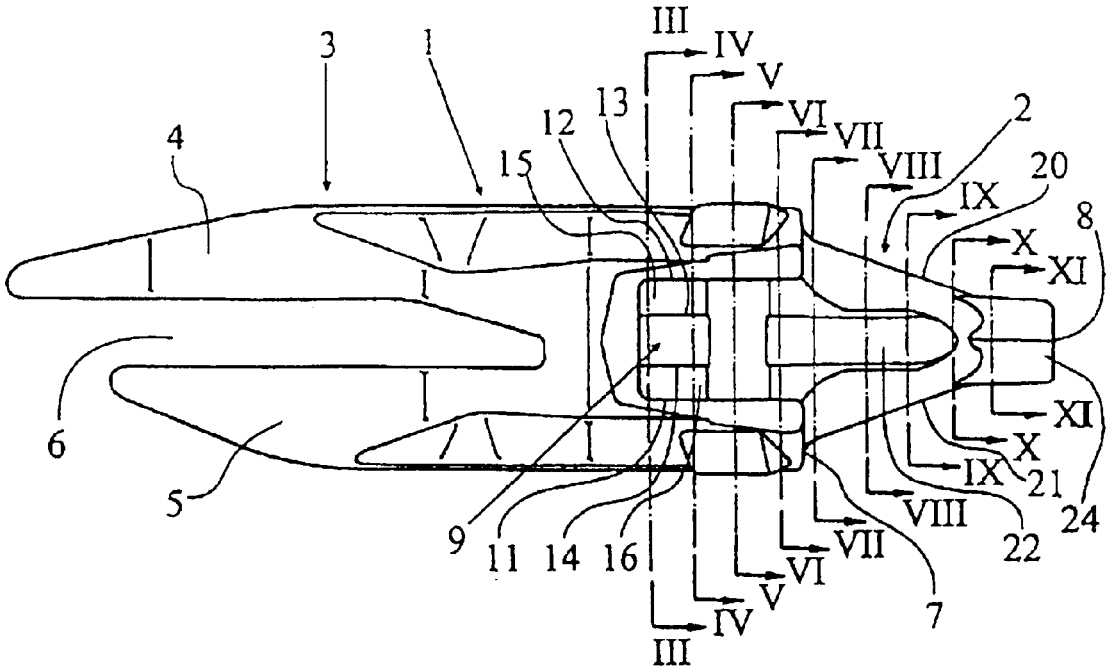
FIGS. 1 and 2 show respective views in side elevation and in plan of a coupling for excavator teeth according to the present invention.
Figure 2:
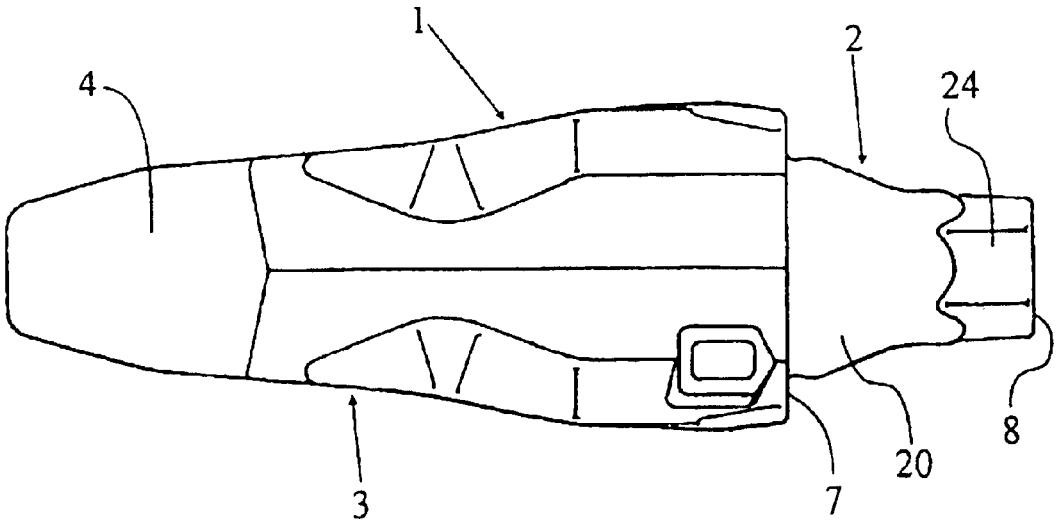
Figure 3:
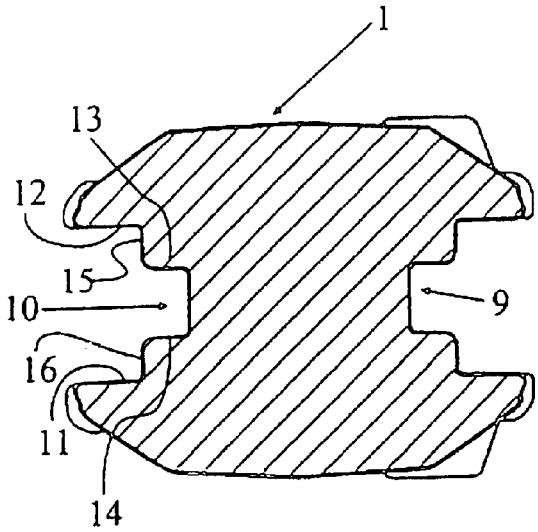
FIGS. 3 to 6 are cross-sections through the tooth coupling which correspond to the double, stepped guide area.
Figure 4:
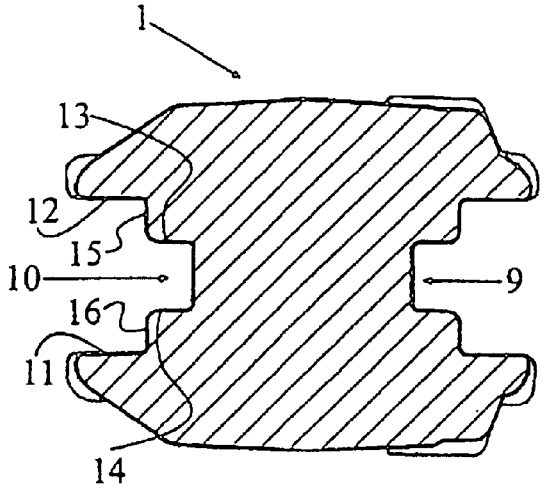
Figure 5:
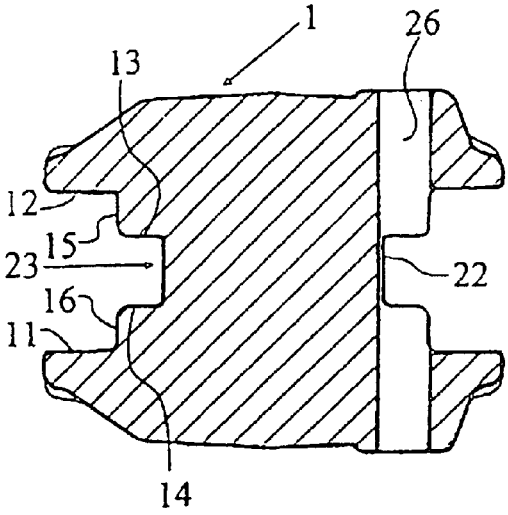
Figure 6:
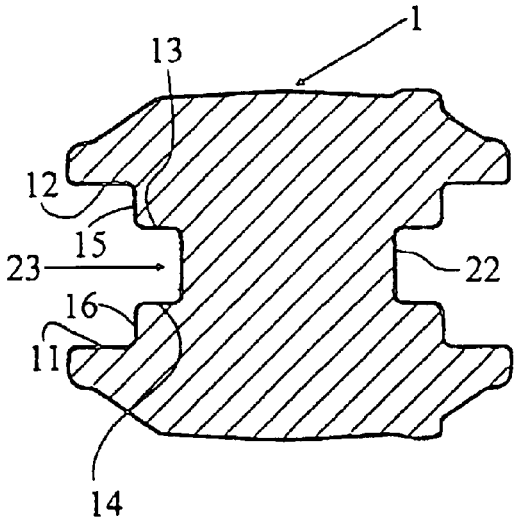
Figure 7:
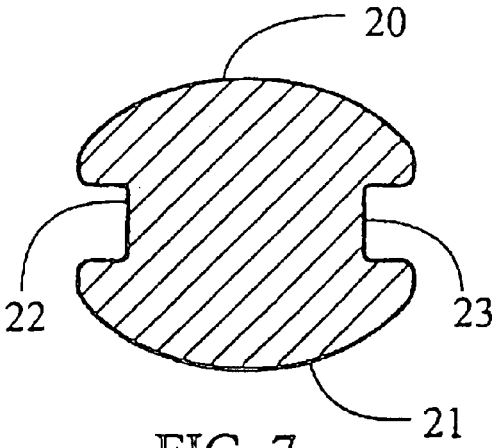
FIGS. 7 to 10 show cross-sections of the coupling area provided with revolution surfaces.
Figure 8:
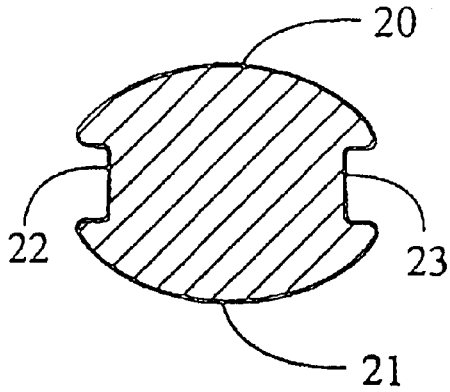
Figure 9:
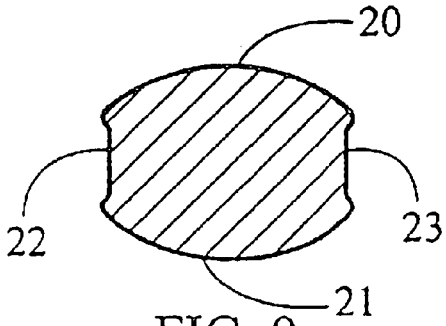
Figure 10:
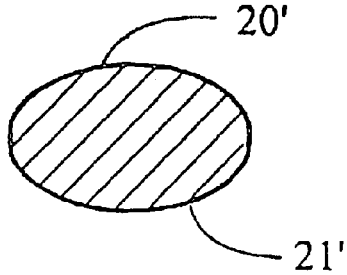

In the variant in FIG. 21, indicated generally by 27, there can be seen a structure varying slightly in the rear extensions 28 and 29, the first of which represents a substantially obtuse-angled structure forming with the extension 29 an indentation at a certain angle with respect to the horizontal, intended for the incorporation of the tooth-carrier on the edge of a bucket or scoop of the earth-moving machine. In this variant the seating 30 for the bolt or cotter pin, which, as in the version in FIG. 1, is provided in the body portion of the tooth-carrier and not in the part termed the "nose" 31, also has wide rebates 32 and 33 on its ends which, combined with a more reduced length of the bolt, as can be observed in FIGS. 28, 32 and 33, makes it possible to receive in the upper and lower portion respective covers 34 and 35 which preferably will be partially housed in the ends of the opening to receive the bolt 36. In this way, additional protection is obtained for the ends of the bolt, which improves the protection of the latter against impacts from stones, metal objects and other elements which could cause its ejection, especially during demolition work, and additionally improving substantially the work of disassembling it for replacement. The bolt, as can be seen in the more detailed section of FIG. 32, has a complex structure in which the body 36 is provided with a wide aperture in which is housed a centering insert 37 provided in its central portion of the outside edge with a small centering projection 38, and which is joined to the base body 36 by means of an area of vulcanized rubber 39, or some other resilient material.

The rectilinear construction of the bolt 36, which has been shown in FIG. 32, may be modified in the form of a gently arched structure, as can be seen in FIG. 33, in which is shown a bolt 40 provided with a certain longitudinal curvature, which is provided with a similar centering insert 41 with the central projection 42, and the union with a similar resilient area 43 being excepted.

The embodiment of the tooth-carrier with the seating for the bolt in the body thereof, instead of being located in the "nose" of the tooth-carrier, imparts greater mechanical strength to the latter and allows the tooth-carrier to be hollowed internally, as can be seen in FIGS. 22 to 26, in which can be seen the hollowing out 44, likewise visible in FIGS. 42 and 43, which opens in the area of coupling on the edge of the scoop or bucket, between the extensions 28 and 29. The said embodiment makes it possible to obtain greater lightness of the tooth-carrier assembly.

Figure 23:
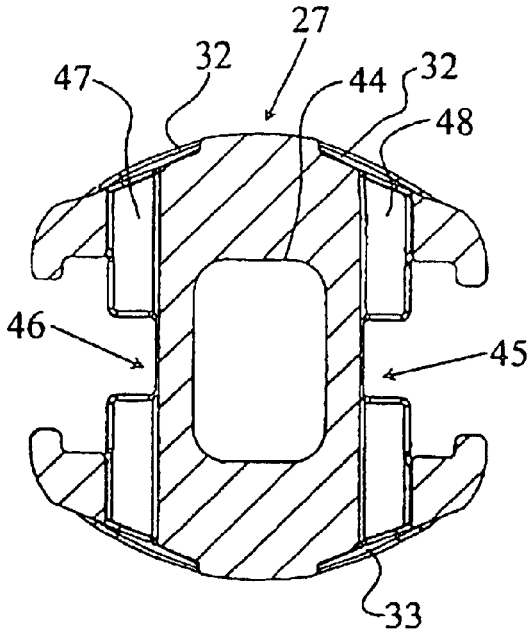
Figure 24:
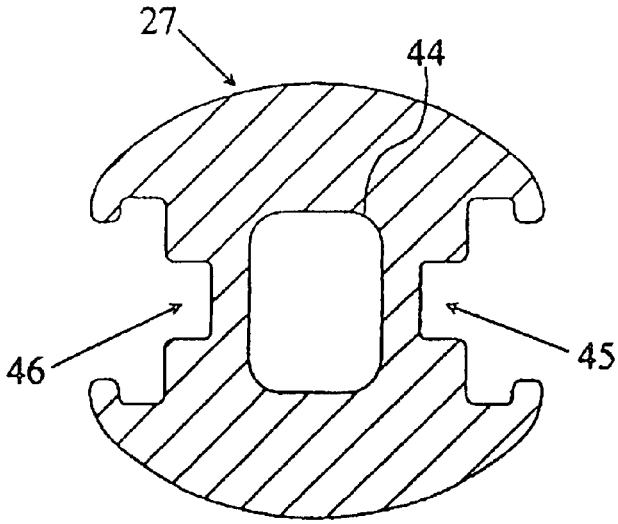
Figure 25:
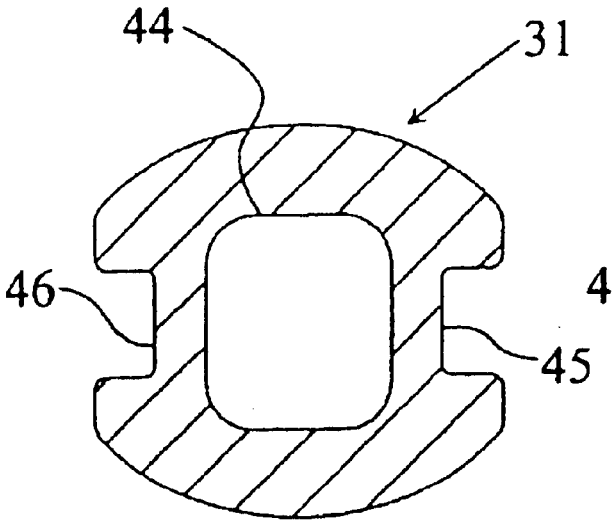
Figure 26:
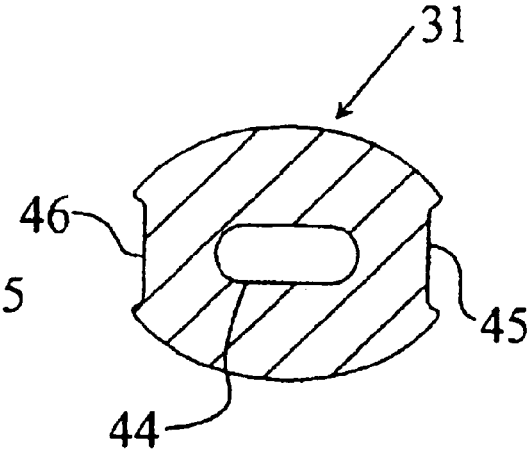
Figure 27:
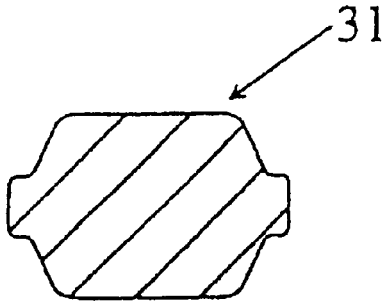

As can be observed in FIGS. 22 to 26, the variant of the tooth-carrier shown in FIG. 21 has lateral centering grooves of symmetrical type 45 and 46, like the corresponding ones in FIG. 1 and following figures, the version with double retaining bolt also being shown, the seatings 47 and 48 for the latter being seen in FIG. 23

In FIGS. 28 and 29 can be seen the coupling of the tooth 49 in the tooth-carrier according to the variant in FIG. 21

On the tooth 49, FIGS. 30 and 31, can be observed the provision of the lugs 50 and 51 equipped with the upper and lower guides such as those indicated by 52 and 53 for the lug 50. The guiding of the lug 51 is effected simply by means of an internally projecting block 54 which substitutes the complete internal rib 55 of the variant of FIG. 1, shown, for example, in FIG. 20. At the same time, the lug 51 has an aperture 56 which will be at the height of the bolt and which makes it possible to observe the correct coupling of the latter and, if required, to assist with some manipulation from inside the said aperture in the event of problems arising with the extraction of the bolt.

Figure 35:
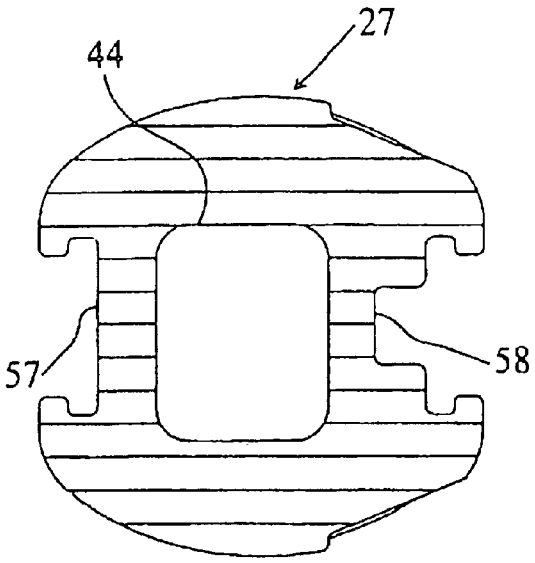
Figure 36:
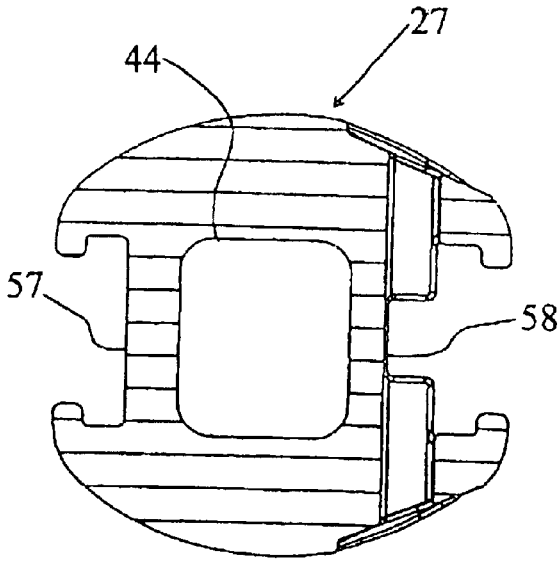
Figure 37:
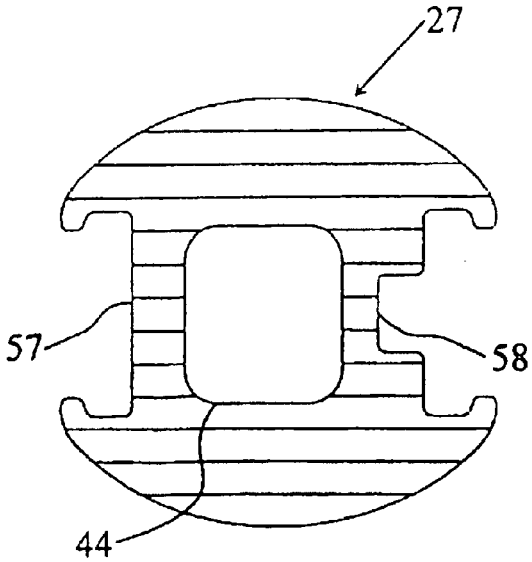
Figure 38:
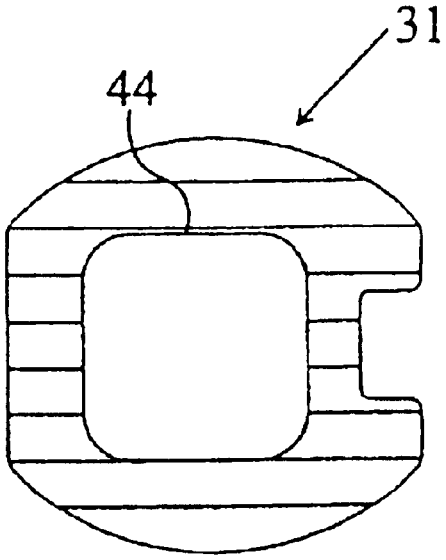
Figure 39:
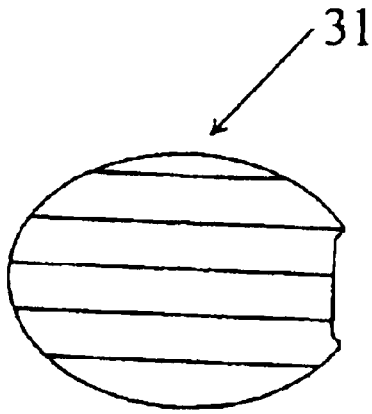
Figure 40:
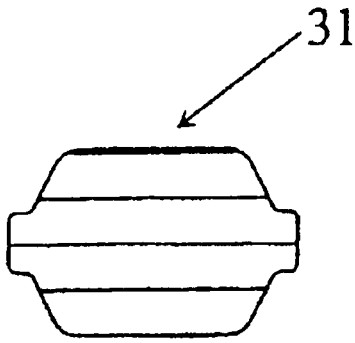

In the sections in FIGS. 35 to 37 there can be observed the arrangement of asymmetric guide grooves, such as the single dovetail groove 57 at one side and the double stepped groove 58 on the opposite side, this constituting a variant that can be used in some cases as a substitute for the symmetrical groove on both sides of the tooth-carrier. In the case shown in FIG. 36, there will also be observed the arrangement of a single cotter pin 59 associated with the double stepped groove 58.

The present invention likewise provides for a special constitution of the edge where the tooth-carrier and the tooth coincide, as can be seen in the figurers and, in particular, in FIG. 21 and in FIGS. 45 and 46. According to the present invention, the edge 60 of the tooth-carrier is not perpendicular to the median plane P of the tooth, but forms a certain angle $\alpha$ with respect to the perpendicular p as shown in FIG. 45, the complementary edge of the tooth 61 having a corresponding shape so that it can make contact against the said edge 60 and by virtue of the angle indicated, the vector $F_1$ which represents the reaction of the stress of the force F exerted on the tooth when working can be broken down into the components $F_{1Z}$ and $F_{1Y}$ of which the latter is a stress transverse to the median plane of the tooth, which therefore collaborates in maintaining the tooth coupled in the tooth-carrier, countering the effect of the component $F_{1Z}$ which tends to eject the tooth and thus considerably reducing the risk of breakage through the mouth of the latter.

By means of the constitution which has been explained, the coupling for excavator teeth which is the subject of the present invention has demonstrated great effectiveness, since it permits secure coupling of the tooth in the tooth-carrier by ensuring multiple areas of contact in different planes for the distribution of the stresses on large surfaces for the purpose of reducing the wear in the coupling and increasing its useful life.

What is claimed is:

1. A device for coupling a tooth having lateral wings to an excavator machine having a bucket with an active edge, said coupling device comprising:

a tooth-carrying portion configured for coupling the tooth to the active edge of the bucket;

a projecting portion extending from said tooth-carrying portion and tapering towards an opposite free end substantially complementary in shape to seat the tooth, said tooth-carrying portion including a front edge that forms two recesses at an interface with said projecting portion for receiving and retaining a rear edge of a mouth of the tooth, the front edge forming an acute angle relative to an axis perpendicular to a longitudinal median plane of the tooth, said projecting portion having a plurality of successive areas disposed between the tooth and said tooth-carrying [element] *portion*, said plural areas comprising:

a first area of stepped guiding profiles that open on lateral outer surfaces of said tooth-carrying portion to form longitudinally disposed grooves configured to receive complementary shaped profiles of the lateral wings of the tooth;

a second guiding area, following said first area, including a plurality of conically shaped revolution surfaces on opposites sides of an axial plane;

an end terminal area having a lateral cross section of irregular hexagonal shape;

an internal projecting block receivable in said grooves; and a pin for engaging said internal projecting block in said grooves to retain said tooth on said tooth-carrying portion;

said tooth-carrying portion having at least one hole defined longitudinally therein for receiving the pin, the at least one hole being interrupted by the stepped guiding profiles of the first area and offset relative to the recesses of the front edge of said tooth-carrying portion.

2. The coupling device in accordance with claim 1, wherein the recesses extend along a widest portion of a mating area formed by the conically shaped revolution surfaces.

3. The coupling device in accordance with claim 2, wherein the recesses have an upper portion and a lower portion limited at its ends by the stepped guiding profiles.

4. The coupling device in accordance with claim 2, wherein the recesses are disposed at a widest part of the conically shaped revolution surfaces that are limited on its lateral sides by the stepped guiding profiles, the conically shaped revolution surfaces merging uninterrupted into the end terminal area.

5. The coupling device in accordance with claim 1, wherein the recesses form a first stop for receiving a rear edge of a mouth of the tooth and a second stop is formed by terminating walls of the stepped guiding profile that receive terminating ends of the lateral wings.

6. The coupling device in accordance with claim 1, wherein said pin is shorter in length [that] *than* the at least one hole for receiving said pin so as to accommodate at least one of upper and lower removable covers for closing the at least one hole.

7. The coupling device in accordance with claim 6, wherein said *at least one of said upper and lower removable* covers [are] *is* partially seated in *a corresponding* upper [and] *or* lower [recesses] *recess* of the at least one hole.

8. The coupling device in accordance with claim 1, wherein the end terminating area has an irregular hexagon lateral cross sectional shape.

9. The coupling device in accordance with claim 1, wherein the pin is completely enclosed within the tooth-carrying [element] *portion* and projecting portion so as to be protected against wear and external impact.

*10. A tooth carrier (1, 27) for connecting a tooth to a machine for moving materials, comprising:*

*a projecting portion (2, 31) configured to be located in a cavity of the tooth (17, 49, 61), and an opening (9, 10) located on each side of said projecting portion configured to receive wings (18, 19, 50, 51) projecting backwards from the tooth on each side of the cavity, wherein said projecting portion has an at least partly decreasing cross section area towards a free end (8) of said projecting portion and along a connection direction of the tooth and said tooth carrier, wherein said tooth carrier has a lateral straight guide (22, 23, 45, 46, 58) extending in at least one of said openings (9, 10) and in the connection direction of the tooth and said tooth carrier, said guide configured to receive a stop member (54, 55) of one of the wings of the tooth, with the stop member projecting inwardly from the wing, said tooth carrier further comprises at least one hole (26, 30, 47, 48) for a retention pin (25, 36, 40, 59), and said at least one hole extends from an upper surface of said tooth carrier and intersects said guide such that when the pin is in an inserted position, the pin locks the stop member and holds the tooth in a desired position on said tooth carrier; and wherein said at least one hole extends through said tooth carrier.*

*11. The tooth carrier according to claim 10, wherein said guide (22, 23, 45, 46, 58) starts on a lateral surface of said projecting portion (2, 31) and ends behind said at least one hole (26, 30, 47, 48) for the retention pin.*

*12. The tooth carrier according to claim 10, wherein said guide and said opening have a stepwise character (9,10,11, 12,13,14,15,16,22,23,45,46,57,58).*

*13. The tooth carrier according to claim 10, wherein said at least one hole (26, 30, 47, 48) for the retention pin is located in a body (3) of said tooth carrier at a position behind said projecting portion (2, 31).*

*14. The tooth carrier according to claim 10, wherein said at least one hole (26, 30, 47, 48) for the retention pin extends substantially parallel to a lateral inner surface (15, 16) of said opening (9, 10).*

*15. The tooth carrier according to claim 10, wherein said at least one hole (26, 30, 47, 48) for the retention pin extends in a substantially vertical direction that is transverse to the connection direction of the tooth and said tooth carrier.*

*16. The tooth carrier according to claim 10, wherein each of said openings is defined by walls and at least one part of said walls defining each opening (9,10) projects on an outside of said respective opening forming said guide for the respective wing of the tooth.*

*17. The tooth carrier according to claim 10, wherein said projecting portion (2,31) has a region with at least one curved surface (20,21;20',21').*

*18. The tooth carrier according to claim 17, wherein said at least one curved surface is a first curved surface (20,20') that faces upwards, and said projecting portion further comprises a second curved surface (21,21') that faces downwards so as to oppose said first curved surface.*

*19. The tooth carrier according to claim 18, wherein said first curved surface forms part of an envelope surface of a first cone and said second curved surface forms part of an envelope surface of a second cone, and wherein symmetrical axes of said two opposed conical surfaces (20,21;20',21') extend in a same vertical plane and at a vertical distance from each other.*

*20. The tooth carrier according to claim 17, wherein said at least one curved surface (20, 21; 20', 21') forms part of an envelope surface of a cone.*

*21. The tooth carrier according to claim 10, wherein said projecting portion (2, 31) has a region (24) at said free end (8) of said projecting portion with substantially a same cross section shape and size in two vertical planes at a distance from each other in the longitudinal direction of said projecting portion.*

*22. The tooth carrier according to claim 21, wherein said region (24) at said free end (8) of said projecting portion (2,31) has a prismatic cross section shape.*

*23. The tooth carrier according to claim 21, wherein said region (24) at said free end (8) of said projecting portion (2,31) has a cross section in a shape of a hexagon.*

*24. The tooth carrier according to claim 10, further comprising a body (3) at a position behind said projecting portion (2,31), and wherein said projecting portion (2,31) is connected to said body (3) of the tooth carrier by a surface (60) that is configured to contact the tooth (61) and that is at least partly inclined forward in relation to a plane perpendicular to the connection direction of the tooth and said tooth carrier.*

*25. The tooth carrier according to claim 24, wherein said connection surface (60) has a curved shape.*

*26. A tooth (17,49,61) for connecting to a tooth carrier (1,27) of a machine for moving materials, said tooth comprising:*

*a cavity configured to receive at least a part of a projecting portion (2,31) of the tooth carrier, and wings (18,19,50,51) projecting backwards from said tooth on each side of said cavity and configured to be located in lateral openings (9,10) in the tooth carrier, wherein said cavity has an at least partly decreasing cross section area from a mouth of said cavity towards an inner end of said cavity; wherein at least one of said wings (18,19,50,51) is provided with a stop member (54,55), said stop member projecting inwardly from said corresponding wing for locating said stop member in a lateral straight guide (22,23,45,46,58) in one of the openings (9,10) in the tooth carrier, and wherein said stop member is configured to be locked in the straight guide by a retention pin (25,36,40,59) inserted in a hole extending through the tooth carrier in order to hold said tooth in a desired position on the tooth carrier; and*

*wherein said stop member forms a rib (55) extending in a connection direction of said tooth and the tooth carrier, and wherein said rib is interrupted by an opening for said pin.*

*27. A tooth (17,49,61) for connecting to a tooth carrier (1,27) of a machine for moving materials, said tooth comprising:*

*a cavity configured to receive at least a part of a projecting portion (2,31) of the tooth carrier, and wings (18,19,50,51) projecting backwards from said tooth on each side of said cavity and configured to be located in lateral openings (9,10) in the tooth carrier, wherein said cavity has an at least partly decreasing cross section area from a mouth of said cavity towards an inner end of said cavity; wherein at least one of said wings (18,19,50,51) is provided with a stop member (54,55), said stop member projecting inwardly from said corresponding wing for locating said stop member in a lateral straight guide (22,23,45,46,58) in one of the openings (9,10) in the tooth carrier, and wherein said stop member is configured to be locked in the straight guide by a retention pin (25,36,40,59) inserted in a hole extending through the tooth carrier in order to hold said tooth in a desired position on the tooth carrier; and*

*wherein each of said wings (18,19,50,51) is provided with stepped guides (52,53) at least at one of an upper and lower region of said respective wing.*

*28. A tooth (17,49,61) for connecting to a tooth carrier (1,27) of a machine for moving materials, said tooth comprising:*

*a cavity configured to receive at least a part of a projecting portion (2,31) of the tooth carrier, and wings (18,19,50,51) projecting backwards from said tooth on each side of said cavity and configured to be located in lateral openings (9,10) in the tooth carrier, wherein said cavity has an at least partly decreasing cross section area from a mouth of said cavity towards an inner end of said cavity; wherein at least one of said wings (18,19,50,51) is provided with a stop member (54,55), said stop member projecting inwardly from said corresponding wing for locating said stop member in a lateral straight guide (22,23,45,46,58) in one of the openings (9,10) in the tooth carrier, and wherein said stop member is configured to be locked in the straight guide by a retention pin (25,36,40,59) inserted in a hole extending through the tooth carrier in order to hold said tooth in a desired position on the tooth carrier; and*

*wherein said wing (50,51) provided with said stop member (54) is also provided with an aperture traversing said wing at a position corresponding to the pin when inserted in the hole extending through the tooth carrier to lock the stop member.*

*29. A tooth (17,49,61) for connecting to a tooth carrier (1,27) of a machine for moving materials, said tooth comprising:*

*a cavity configured to receive at least a part of a projecting portion (2,31) of the tooth carrier, and wings (18,19,50,51) projecting backwards from said tooth on each side of said cavity and configured to be located in lateral openings (9,10) in the tooth carrier, wherein said cavity has an at least partly decreasing cross section area from a mouth of said cavity towards an inner end of said cavity; wherein at least one of said wings (18,19,50,51) is provided with a stop member (54,55), said stop member projecting inwardly from said corresponding wing for locating said stop member in a lateral straight guide (22,23,45,46,58) in one of the openings (9,10) in the tooth carrier, and wherein said stop member is configured to be locked in the straight guide by a retention pin (25,36,40,59) inserted in a hole extending through the tooth carrier in order to hold said tooth in a desired position on the tooth carrier; and*

*wherein an inner shape of said cavity corresponds to an outer shape of the projecting portion (2,31) of the tooth carrier.*

*30. A tooth (17,49,61) for connecting to a tooth carrier (1,27) of a machine for moving materials, said tooth comprising:*

*a cavity configured to receive at least a part of a projecting portion (2,31) of the tooth carrier, and wings (18,19,50,51) projecting backwards from said tooth on each side of said cavity and configured to be located in lateral openings (9,10) in the tooth carrier, wherein said cavity has an at least partly decreasing cross section area from a mouth of said cavity towards an inner end of said cavity; wherein at least one of said wings (18,19,50,51) is provided with a stop member (54,55), said stop member projecting inwardly from said corresponding wing for locating said stop member in a lateral straight guide (22,23,45,46,58) in one of the openings (9,10) in the tooth carrier, and wherein said stop member is configured to be locked in the straight guide by a retention pin (25,36,40,59) inserted in a hole extending through the tooth carrier in order to hold said tooth in a desired position on the tooth carrier; and*

*wherein at least one of the rear surfaces of the tooth (61), which is located between said wings, is configured to contact the tooth carrier and is at least partly inclined forwards in relation to a plane perpendicular to the connection direction of said tooth and the tooth carrier.*

*31. The tooth according to claim 30, wherein said connection surface has a curved shape.*

*32. A tooth assembly for a bucket of an earth moving machine, comprising a tooth carrier configured to connect to the bucket and a tooth connected to said tooth carrier;*

*said tooth comprising:*

*a cavity that has an at least partly decreasing cross section area from a mouth of said cavity towards an inner end of said cavity;*

*wings (18, 19, 50, 51) projecting backwards from said tooth on each side of said cavity; and*

*a stop member (54, 55) formed on one of said wings; and*

*said tooth carrier comprising:*

*a projecting portion (2, 31) located in said cavity of said tooth (17, 49, 61), and an opening (9, 10) located on each side of said projecting portion that receives said wings (18, 19, 50, 51) projecting backwards from said tooth on each side of said cavity, wherein said projecting portion has an at least partly decreasing cross section area towards a free end (8) of said projecting portion and along a connection direction of said tooth and said tooth carrier, wherein said tooth carrier has a lateral straight guide (22, 23, 45, 46, 58) extending in at least one of said openings (9,10) and in the connection direction of said tooth and said tooth carrier, said guide receives said stop member (54, 55) of one of said wings of said tooth, with said stop member projecting inwardly from said wing, said tooth carrier further comprises at least one hole (26, 30, 47, 48) in which a retention pin (25, 36, 40, 59) is inserted, and said at least one hole extends from an upper surface of said tooth carrier and intersects said guide such that said pin locks said stop member and holds said tooth in a position on said tooth carrier.*

*33. The tooth assembly according to claim 32, wherein the lateral straight guide extends an entire length of the corresponding wing of the tooth when the tooth is assembled with the tooth carrier.*

*34. A tooth carrier for connecting a replaceable tooth to a machine for moving materials, the tooth carrier comprising:*

*a back area that has a back coupling configured to mount the tooth carrier to the machine for moving material; and*

*a front area that has a front coupling configured to have a tooth mounted thereon, the front coupling extends in a longitudinal direction of the tooth carrier away from the back coupling and towards a free end of the front coupling and has a top side, a bottom side, and two lateral sides;*

*wherein the front coupling comprises:*

*a male projecting portion that has an at least partly decreasing cross sectional area towards the free end of the front coupling in the longitudinal direction;*

*a straight guide defined by a groove that extends in the longitudinal direction on a lateral side of the front coupling; and*

*a hole for receiving a pin, the hole extends through the tooth carrier in a vertical direction that is transverse to the longitudinal direction, the hole intersecting the straight guide such that when the pin is in an inserted position, the pin blocks free movement through the groove.*

*35. The tooth carrier according to claim 34, wherein the back coupling is a fork-shaped structure defined by two backwardly extending arms.*

*36. The tooth carrier according to claim 34, wherein the groove has a stepped cross section taken in a plane transverse to the longitudinal direction.*

*37. The tooth carrier according to claim 34, wherein the hole intersects a base of the groove.*

*38. The tooth carrier according to claim 34, wherein the hole extends from the top side to the bottom side.*

*39. The tooth carrier according to claim 34, wherein the straight guide extends backwards from the free end behind a point relative to the free end at which the cross sectional area of the male projecting portion partly decreases towards the free end; and*

*wherein the hole extends vertically behind the point relative to the free end at which the cross sectional area of the male projecting portion partly decreases towards the free end.*

*40. The tooth carrier according to claim 34, wherein the projecting portion has a first curved surface that faces upwards and a second curved surface that faces downwards so as to oppose said first curved surface;*

*wherein the first curved surface forms part of an envelope surface of a first cone and the second curved surface forms part of an envelope surface of a second cone, and*

*wherein symmetrical axes of the two opposed conical surfaces extend in a same vertical plane and at a vertical distance from each other.*

*41. The tooth carrier according to claim 34, wherein the free end of the projecting portion has a cross section in a shape of an irregular hexagon.*

*42. The tooth carrier according to claim 34, wherein a base of the projecting portion defines a contact surface for contacting the tooth, wherein the contact surface is at least partly inclined forward in relation to a plane perpendicular to the longitudinal direction.*

*43. A tooth assembly for a bucket of an earth moving machine, comprising:*

*a tooth carrier according to claim 34;*

*a retention pin inserted in the hole of the tooth carrier; and*

*a tooth that has an earth engaging front end and a back end connected to the front coupling of the tooth carrier, the tooth further comprising:*

*a cavity with a least a partially decreasing cross section towards the front end of the tooth in the longitudinal direction, the cavity receives at least a part of the projecting portion, and*

*a wing on a side of the cavity extending backwards away from the front end from the tooth and mating with the straight guide, the wing further comprising a stop member projecting inwardly from wing with a front surface abutting the retention pin so as to prevent the tooth from separating from the tooth carrier.*

*44. The tooth assembly according to claim 43, wherein the stop member is a rib extending in the longitudinal direction, and wherein the rib is interrupted by an opening with the retention pin passing therethrough.*

*45. A tooth carrier (1, 27) for connecting a tooth to a machine for moving materials, comprising:*

*a projecting portion (2, 31) configured to be located in a cavity of the tooth (17, 49, 61), and an opening (9, 10) located on each side of said projecting portion configured to receive wings (18, 19, 50, 51) projecting backwards from the tooth on each side of the cavity, wherein said projecting portion has an at least partly decreasing cross section area towards a free end (8) of said projecting portion and along a connection direction of the tooth and said tooth carrier, wherein said tooth carrier has a lateral straight guide (22, 23, 45, 46, 58) extending in at least one of said openings (9, 10) and in the connection direction of the tooth and said tooth carrier, said guide configured to receive a stop member (54, 55) of one of the wings of the tooth, with the stop member projecting inwardly from the wing, said tooth carrier further comprises at least one*

*hole (26, 30, 47, 48) for a retention pin (25, 36, 40, 59), and said at least one hole extends from an upper surface of said tooth carrier and intersects said guide such that when the pin is in an inserted position, the pin locks the stop member and holds the tooth in a desired position on said tooth carrier; and wherein said tooth-carrier further comprises a front edge that forms two recesses at an interface with said projecting portion for receiving and retaining a rear edge of a mouth of the tooth, the front edge forming an acute angle relative to an axis perpendicular to a longitudinal median plane of the tooth.*

*46. A tooth carrier (1, 27) for connecting a tooth to a machine for moving materials, comprising:*

*a projecting portion (2, 31) configured to be located in a cavity of the tooth (17, 49, 61), and an opening (9, 10) located on each side of said projecting portion configured to receive wings (18, 19, 50, 51) projecting backwards from the tooth on each side of the cavity, wherein said projecting portion has an at least partly decreasing cross section area towards a free end (8) of said projecting portion and along a connection direction of the tooth and said tooth carrier, wherein said tooth carrier has a lateral straight guide (22, 23, 45, 46, 58) extending in at least one of said openings (9, 10) and in the connection direction of the tooth and said tooth carrier, said guide configured to receive a stop member (54, 55) of one of the wings of the tooth, with the stop member projecting inwardly from the wing, said tooth carrier further comprises at least one hole (26, 30, 47, 48) for a retention pin (25, 36, 40, 59), and said at least one hole extends from an upper surface of said tooth carrier and intersects said guide such that when the pin is in an inserted position, the pin locks the stop member and holds the tooth in a desired position on said tooth carrier; and wherein said projecting portion comprises an end portion having a cross section of irregular hexagonal shape.*

*47. A tooth carrier (1, 27) for connecting a tooth to a machine for moving materials, comprising:*

*a retention pin; and*

*a projecting portion (2, 31) configured to be located in a cavity of the tooth (17, 49, 61), and an opening (9, 10) located on each side of said projecting portion configured to receive wings (18, 19, 50, 51) projecting backwards from the tooth on each side of the cavity, wherein said projecting portion has an at least partly decreasing cross section area towards a free end (8) of said projecting portion and along a connection direction of the tooth and said tooth carrier, wherein said tooth carrier has a lateral straight guide (22, 23, 45, 46, 58) extending in at least one of said openings (9, 10) and in the connection direction of the tooth and said tooth carrier, said guide configured to receive a stop member (54, 55) of one of the wings of the tooth, with the stop member projecting inwardly from the wing, said tooth carrier further comprises at least one hole (26, 30, 47, 48) for the retention pin (25, 36, 40, 59), and said at least one hole extends from an upper surface of said tooth carrier and intersects said guide such that when the retention pin is in an inserted position, the retention pin locks the stop member and holds the tooth in a desired position on said tooth carrier; and wherein, when the retention pin is in an inserted position, the retention pin is completely enclosed within the tooth carrier so as to be protected against wear and external impact.*

* * * * *